(12) United States Patent         (10) Patent No.:     US 12,551,089 B2
    Kamon                         (45) Date of Patent:     Feb. 17, 2026

(54) MEDICAL IMAGE PROCESSING APPARATUS, ENDOSCOPE SYSTEM, MEDICAL IMAGE PROCESSING METHOD, AND MEDICAL IMAGE PROCESSING PROGRAM FOR SWITCHING BETWEEN DETECTION PROCESSES

(71) Applicant: FUJIFILM Corporation, Tokyo (JP)

(72) Inventor: Shumpei Kamon, Kanagawa (JP)

(73) Assignee: FUJILFILM Corporation, Tokyo (JP)

( * ) Notice: Subject to any disclaimer, the term of this patent is extended or adjusted under 35 U.S.C. 154(b) by 358 days.

(21) Appl. No.: 18/453,291

(22) Filed: Aug. 21, 2023

(65) Prior Publication Data

US 2023/0389774 A1    Dec. 7, 2023

Related U.S. Application Data

(63) Continuation of application No. PCT/JP2022/007788, filed on Feb. 25, 2022.

(30) Foreign Application Priority Data

Feb. 26, 2021 (JP) ................................ 2021-030057

(51) Int. Cl.
    *A61B 1/00*     (2006.01)
    *G06T 7/00*     (2017.01)
    *G16H 30/40*    (2018.01)

(52) U.S. Cl.
    CPC ...... *A61B 1/00009* (2013.01); *A61B 1/00006* (2013.01); *A61B 1/000094* (2022.02);
    (Continued)

(58) Field of Classification Search
    None
    See application file for complete search history.

(56) References Cited

U.S. PATENT DOCUMENTS

| | | | |
|---|---|---|---|
| 11,464,394 B2 | 10/2022 | Endo | |
| 2004/0141639 A1* | 7/2004 | Matsui | .................. G06T 7/0012 |
| | | | 382/132 |

(Continued)

FOREIGN PATENT DOCUMENTS

| | | |
|---|---|---|
| JP | 2020069300 | 5/2020 |
| JP | 2021007512 | 1/2021 |

(Continued)

OTHER PUBLICATIONS

"International Search Report (Form PCT/ISA/210) of PCT/JP2022/007788," mailed on Apr. 26, 2022, with English translation thereof, pp. 1-5.

(Continued)

*Primary Examiner* — John P Leubecker
(74) *Attorney, Agent, or Firm* — JCIPRNET

(57) ABSTRACT

A medical image processing apparatus includes a processor which is configured to execute an image acquisition process of acquiring a time-series medical image; a plurality of detection processes of detecting a region of interest from the acquired medical image; a display control process of causing a display apparatus to display at least one detection result among detection results obtained in the plurality of detection processes; a selection process of selecting, from among the plurality of detection processes, a detection process for which a detection result is to be displayed on the display apparatus; and a switching control process of controlling, in accordance with a detection state of the region of interest in the plurality of detection processes, whether or not to permit switching of a detection process for which a detection result is to be displayed to the selected detection process.

13 Claims, 13 Drawing Sheets

(52) U.S. Cl.
CPC .... *A61B 1/000096* (2022.02); *A61B 1/00045* (2013.01); *G06T 7/0012* (2013.01); *G16H 30/40* (2018.01); *G06T 2207/10068* (2013.01); *G06T 2207/30004* (2013.01)

(56) References Cited

U.S. PATENT DOCUMENTS

| | | | |
|---|---|---|---|
| 2004/0161142 A1* | 8/2004 | Takeo | G06T 7/0012 382/173 |
| 2005/0041844 A1* | 2/2005 | Yamanaka | G06T 7/0012 382/128 |
| 2006/0222222 A1* | 10/2006 | Fujita | G06T 7/0012 382/128 |
| 2012/0302847 A1* | 11/2012 | Ozawa | A61B 1/063 600/339 |
| 2017/0091385 A1* | 3/2017 | Knoplioch | G16H 30/40 |
| 2020/0146529 A1 | 5/2020 | Kono et al. | |
| 2020/0320702 A1 | 10/2020 | Kamon | |
| 2021/0073977 A1* | 3/2021 | Carter | G06T 11/20 |
| 2021/0158525 A1* | 5/2021 | Iwase | A61B 3/0025 |
| 2021/0235980 A1 | 8/2021 | Oosake | |
| 2021/0272278 A1* | 9/2021 | Terai | G16H 15/00 |
| 2021/0342195 A1* | 11/2021 | Kudo | A61B 5/055 |
| 2021/0369238 A1 | 12/2021 | Uchihara et al. | |
| 2023/0016855 A1 | 1/2023 | Endo | |
| 2023/0057933 A1* | 2/2023 | Hayashida | G16H 50/70 |
| 2023/0086972 A1 | 3/2023 | Kamon | |

FOREIGN PATENT DOCUMENTS

| | | |
|---|---|---|
| WO | 2019016912 | 1/2019 |
| WO | 2019138773 | 7/2019 |
| WO | 2020075578 | 4/2020 |
| WO | 2020174778 | 9/2020 |

OTHER PUBLICATIONS

"Written Opinion of the International Searching Authority (Form PCT/ISA/237) of PCT/JP2022/007788," mailed on Apr. 26, 2022, with English translation thereof, pp. 1-6.

\* cited by examiner

FIG. 9

| Settings of operation and display of result | Operate all detectors | ● ON | ○ OFF |
| | Display bounding box | ● ON | ○ OFF |
| | Report by type of line and color | ● ON | ○ OFF |
| | Report switching | ● ON | ○ OFF |
| | Report by sound | ○ ON | ● OFF |
| | Switching prohibition time at detection of ROI | 1.5 second(s) | |
| | Switching permission time at detection of no ROI | 1.0 second(s) | |
| | OK | Cancel | |

MEDICAL IMAGE PROCESSING APPARATUS, ENDOSCOPE SYSTEM, MEDICAL IMAGE PROCESSING METHOD, AND MEDICAL IMAGE PROCESSING PROGRAM FOR SWITCHING BETWEEN DETECTION PROCESSES

CROSS-REFERENCE TO RELATED APPLICATIONS

The present application is a Continuation of PCT International Application No. PCT/JP2022/007788 filed on Feb. 25, 2022 claiming priority under 35 U.S.C § 119(a) to Japanese Patent Application No. 2021-030057 filed on Feb. 26, 2021. Each of the above applications is hereby expressly incorporated by reference, in its entirety, into the present application.

BACKGROUND OF THE INVENTION

1. Field of the Invention

The present invention relates to a medical image processing apparatus, an endoscope system, a medical image processing method, and a medical image processing program, and particularly relates to a technique of detecting a region of interest from a medical image.

2. Description of the Related Art

Displaying of a detection result of a region of interest obtained by a medical image processing apparatus on a display apparatus has been known as a method for assisting a user, such as a medical doctor, in observing a medical image or making a diagnosis. For example, WO2019/138773A describes that a region-of-interest detecting unit corresponding to a position indicated by position information is selected from among a plurality of region-of-interest detecting units, a region of interest is detected by the selected region-of-interest detecting unit, and the result is displayed. JP2020-69300A describes that a target to be displayed is switched between a detection result and a discrimination result.

SUMMARY OF THE INVENTION

In an examination using a medical apparatus such as an endoscope apparatus or an ultrasonic apparatus, observation in a plurality of different situations may be performed in a series of procedures. For example, upper endoscopy in which different organs such as the pharynx, esophagus, stomach, and duodenum are observed; ultrasonic diagnosis in which various organs are observed in various fields of view; and the like may all be performed in a series of procedures of an examination. Thus, in the case of providing a diagnosis assistance function to a user for such an examination, a required assistance function varies according to a situation. Even in similar functions, an optimum recognizer may vary according to a situation. Thus, it is preferable to automatically switch the assistance function in accordance with a situation, thereby constantly providing optimum assistance to the user.

However, in the related art such as the above-described WO2019/138773A and JP2020-69300A, it is difficult to appropriately switch the diagnosis assistance function.

The present invention has been made in view of these circumstances, and an object of the present invention is to provide a medical image processing apparatus, an endoscope system, a medical image processing method, and a medical image processing program that are capable of appropriately switching a diagnosis assistance function.

To achieve the above-described object, a medical image processing apparatus according to a first aspect of the present invention is a medical image processing apparatus including a processor. The processor is configured to execute an image acquisition process of acquiring a time-series medical image; a plurality of detection processes of detecting a region of interest from the acquired medical image; a display control process of causing a display apparatus to display at least one detection result among detection results obtained in the plurality of detection processes; a selection process of selecting, from among the plurality of detection processes, a detection process for which a detection result is to be displayed on the display apparatus; and a switching control process of controlling, in accordance with a detection state of the region of interest in the plurality of detection processes, whether or not to permit switching of a detection process for which a detection result is to be displayed to the selected detection process.

The detection state of a region of interest is related to transition of an observation situation (for example, a situation in which an organ or area to be observed, a viewing direction, or the like is changing). Thus, as a result of controlling whether or not to permit switching in accordance with the detection state of a region of interest, a detection result obtained in an appropriate detection process can be displayed in accordance with transition of an observation situation. Thus, according to the first aspect, it is possible to appropriately switch a diagnosis assistance function (a function of assisting a user in making a diagnosis by displaying a detection result obtained in an appropriate detection process).

The "plurality of detection processes" in the first aspect may be a plurality of detection processes different in, for example, a target organ or area, an observation direction, a detection algorithm, an image processing parameter, or the like. These detection processes may be processes using a detector or trained model constituted through machine learning.

In the first aspect, "acquiring a time-series medical image" includes sequential acquisition of a plurality of medical images captured at a determined frame rate. The acquisition may be performed in real time or in non-real time.

The medical image processing apparatus according to the first aspect can be implemented as, for example, a processor portion of a medical image processing system, but is not limited to such an aspect. The "medical image" is an image acquired as a result of imaging, measurement, or the like performed on a living body, such as a human body, for the purpose of diagnosis, treatment, measurement, or the like, and may be, for example, an endoscopic image, an ultrasound image, a computed tomography (CT) image, or a magnetic resonance imaging (MRI) image. The medical image is also referred to as a medical image.

In a medical image processing apparatus according to a second aspect, in the first aspect, the processor is configured not to, in the switching control process, permit the switching around a time at which a determination is made that a region of interest is present in the medical image in at least one of the plurality of detection processes. The processor is capable of performing control of not permitting switching until a determined time elapses after it is determined that "a region of interest is present in a medical image", for example.

In a medical image processing apparatus according to a third aspect, in the first aspect, the processor is configured to, in the switching control process, permit the switching around a time at which a determination is made that a region of interest is absent in the medical image in at least one of the plurality of detection processes. The processor is capable of performing control of permitting switching until a determined time elapses after it is determined that "a region of interest is absent in a medical image", for example.

In a medical image processing apparatus according to a fourth aspect, in the first aspect, the processor is configured to, in the switching control process, stop a detection process for which a detection result is not to be displayed on the display apparatus. This makes it possible to reduce the processing load and power consumption.

In a medical image processing apparatus according to a fifth aspect, in the fourth aspect, the processor is configured to, in the switching control process, start a detection process that has been switched to a state of displaying a detection result.

In a medical image processing apparatus according to a sixth aspect, in any one of the first to fifth aspects, the processor is configured to further execute a reporting process of reporting, to a user, which detection process is a detection process for which a detection result is to be displayed on the display apparatus. According to the sixth aspect, the user is able to grasp the detection process for which a detection result is displayed. The processor is capable of performing reporting by display on the display apparatus, output of a sound, or the like.

In a medical image processing apparatus according to a seventh aspect, in any one of the first to sixth aspects, the processor is configured to acquire, from the medical image, information indicating an imaging position and/or an imaging direction of the medical image, and perform the selecting on the basis of the acquired information. In the seventh aspect, the processor may be configured to acquire the information by using a detector constituted through machine learning.

In a medical image processing apparatus according to an eighth aspect, in any one of the first to seventh aspects, the processor is configured to acquire, from a determination apparatus configured to determine a state of an imaging apparatus configured to capture the medical image, information indicating an imaging position and/or an imaging direction of the medical image, and perform the selecting on the basis of the acquired information. In the eighth aspect, the processor is capable of determining the state of the imaging apparatus on the basis of information acquired from the determination apparatus (external apparatus) connected to the medical image processing apparatus.

In a medical image processing apparatus according to a ninth aspect, in any one of the first to eighth aspects, the processor is configured to, in the display control process, change a display mode of a detection result to be displayed on the display apparatus in accordance with a detection process. According to the ninth aspect, the user is able to easily grasp the detection process for which a detection result is displayed.

In a medical image processing apparatus according to a tenth aspect, in any one of the first to ninth aspects, the processor is configured to, upon switching of a detector for which a detection result is to be displayed in the switching control process, report that the switching has been performed. The processor is capable of performing reporting by display on the display apparatus, output of a sound, or the like.

To achieve the above-described object, an endoscope system according to an eleventh aspect of the present invention includes the medical image processing apparatus according to any one of the first to tenth aspects; an endoscope to be inserted into a subject, the endoscope having an imaging unit configured to sequentially capture a plurality of the medical images; and the display apparatus. The endoscope system according to the eleventh aspect includes the medical image processing apparatus according to any one of the first to tenth aspects, and is thus capable of appropriately switching a diagnosis assistance function.

To achieve the above-described object, a medical image processing method according to a twelfth aspect of the present invention is a medical image processing method to be executed by a medical image processing apparatus including a processor. The medical image processing method includes an image acquisition step of acquiring a time-series medical image; a detection step of detecting a region of interest from the acquired medical image by using a plurality of detectors; a display control step of causing a display apparatus to display a detection result for at least one detector among detection results obtained in the detection step; a selection step of selecting, from among the plurality of detection processes, a detection process for which a detection result is to be displayed on the display apparatus; and a switching control step of controlling, in accordance with a detection state of the region of interest in the plurality of detection processes, whether or not to permit switching of a detection process for which a detection result is to be displayed to the selected detection process.

According to the twelfth aspect, as in the above-described first aspect, the diagnosis assistance function can be appropriately switched. The medical image processing method according to the twelfth aspect may further include configurations similar to those according to the second to tenth aspects.

To achieve the above-described object, a medical image processing program according to a thirteenth aspect of the present invention is a medical image processing program that causes a medical image processing apparatus including a processor to execute a medical image processing method. The medical image processing method includes an image acquisition step of acquiring a time-series medical image; a detection step of detecting a region of interest from the acquired medical image by using a plurality of detectors; a display control step of causing a display apparatus to display a detection result for at least one detector among detection results obtained in the detection step; a selection step of selecting, from among the plurality of detection processes, a detection process for which a detection result is to be displayed on the display apparatus; and a switching control step of controlling, in accordance with a detection state of the region of interest in the plurality of detection processes, whether or not to permit switching of a detection process for which a detection result is to be displayed to the selected detection process.

According to the thirteenth aspect, as in the above-described first and twelfth aspects, the diagnosis assistance function can be appropriately switched. The medical image processing program according to the thirteenth aspect may be a program that causes a process similar to that according to the second to tenth aspects to be further executed. A non-transitory recording medium storing a computer-readable code of the program according to these aspects may be included in an aspect of the present invention.

As described above, the medical image processing apparatus, the endoscope system, the medical image processing method, and the medical image processing program according to the present invention are capable of appropriately switching a diagnosis assistance function.

BRIEF DESCRIPTION OF THE DRAWINGS

FIG. 9 is a diagram illustrating an example of a processing condition setting screen;

DESCRIPTION OF THE PREFERRED EMBODIMENTS

Hereinafter, an embodiment of a medical image processing apparatus, an endoscope system, a medical image processing method, and a medical image processing program according to the present invention will be described in detail with reference to the accompanying drawings.

First Embodiment

Configuration of Endoscope System

Figure 1:
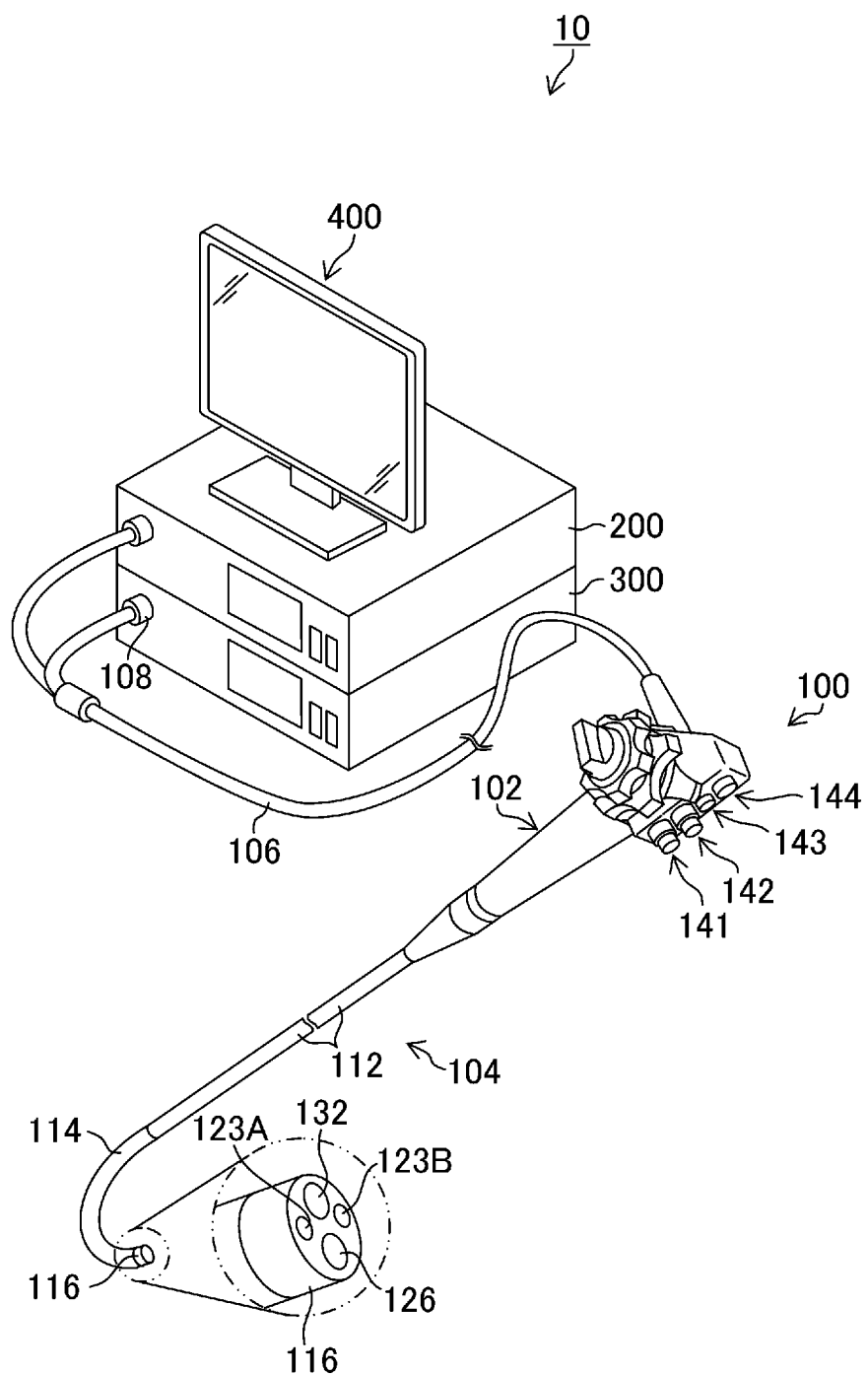
FIG. 1 is an external appearance diagram of an endoscope system according to a first embodiment.
Figure 2:
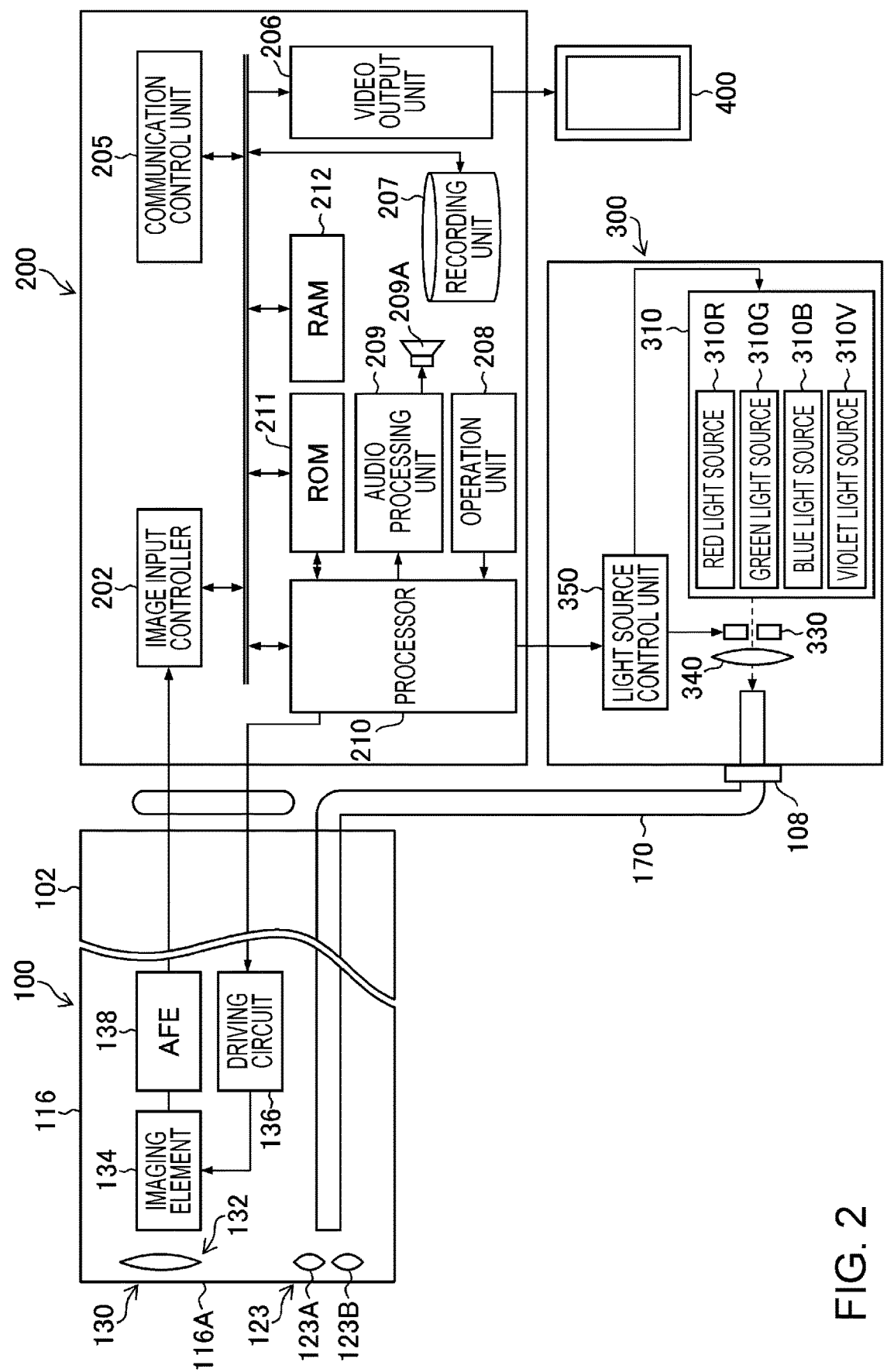
FIG. 2 is a diagram illustrating the configuration of a main part of the endoscope system.
Figure 15:
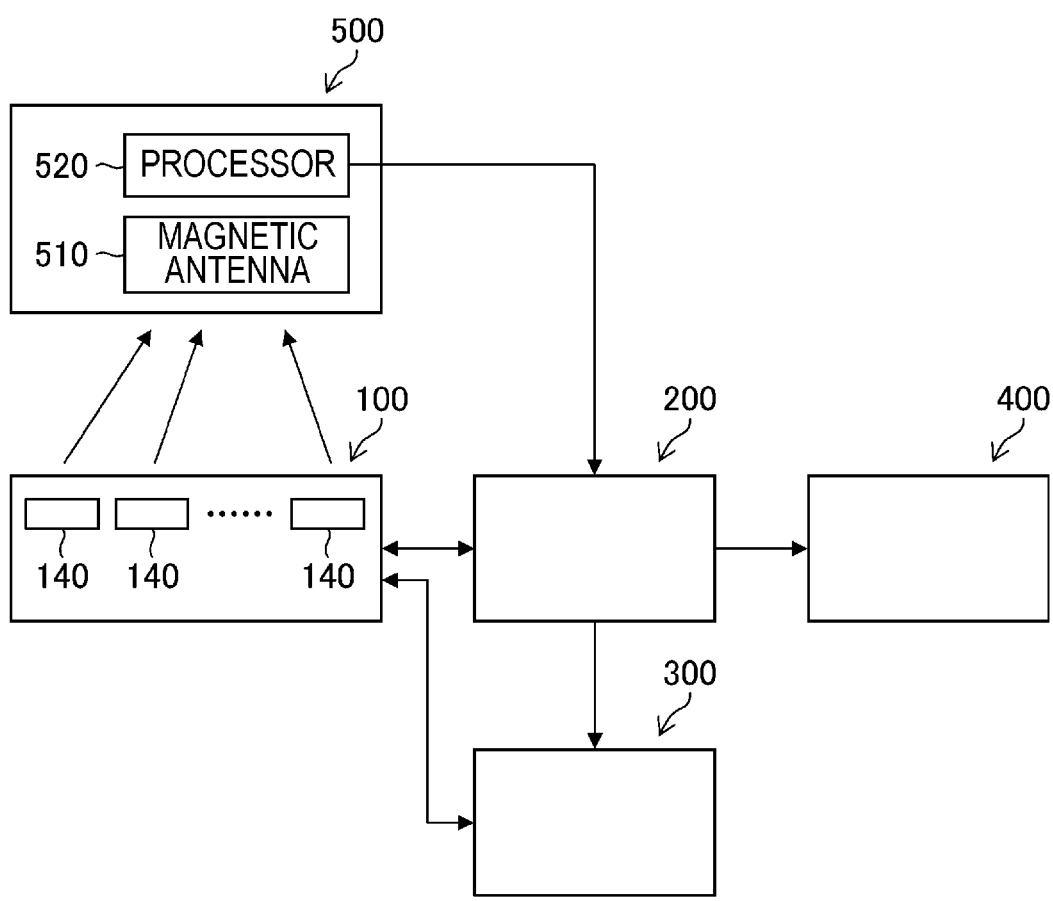
FIG. 15 is a diagram illustrating a state of measuring the position and/or shape of an endoscope by using an endoscope shape measuring apparatus.

FIG. 1 is an external appearance diagram of an endoscope system 10 (a medical image processing apparatus, an endoscope system) according to a first embodiment, and FIG. 2 is a block diagram illustrating the configuration of a main part of the endoscope system 10. As illustrated in FIGS. 1 and 2, the endoscope system 10 is constituted by an endoscope 100 (an endoscope, an imaging apparatus), a medical image processing unit 200 (a medical image processing apparatus, a processor), a light source apparatus 300 (a light source apparatus), and a monitor 400 (a display apparatus). An external apparatus (a determination apparatus) that determines the state of the endoscope 100 by using an electromagnetic wave, an ultrasonic wave, or magnetism may be connected to the endoscope system 10 (see an example in FIG. 15 described below).

Configuration of Endoscope

The endoscope 100 includes a handheld operation section 102 and an insertion section 104 that communicates with the handheld operation section 102. An operator (a user) operates the handheld operation section 102 while grasping it and inserts the insertion section 104 into a body of a subject to perform observation. The handheld operation section 102 is provided with an air/water supply button 141, a suction button 142, a function button 143 to which various functions are allocated, and an imaging button 144 for receiving an imaging instruction operation (a still image, a moving image). The insertion section 104 is constituted by a soft part 112, a bending part 114, and a tip rigid part 116, which are arranged in this order from the handheld operation section 102 side. That is, the bending part 114 is connected to a base end side of the tip rigid part 116, and the soft part 112 is connected to a base end side of the bending part 114. The handheld operation section 102 is connected to a base end side of the insertion section 104. The user is able to change the orientation of the tip rigid part 116 in an up, down, left, or right direction by causing the bending part 114 to bend by operating the handheld operation section 102. The tip rigid part 116 is provided with an imaging optical system 130, an illumination unit 123, a forceps port 126, and so forth (see FIGS. 1 and 2).

During observation or treatment, an operation of an operation unit 208 (see FIG. 2) enables white light (normal light) and/or narrow-band light (special light: for example, one or more of red narrow-band light, green narrow-band light, blue narrow-band light, and violet narrow-band light) to be radiated from illumination lenses 123A and 123B of the illumination unit 123. In addition, an operation of the air/water supply button 141 enables washing water to be ejected from a water supply nozzle that is not illustrated, so that an imaging lens 132 (an imaging lens, an imaging unit) of the imaging optical system 130 and the illumination lenses 123A and 123B can be washed. The forceps port 126 opening in the tip rigid part 116 communicates with a pipe line that is not illustrated, so that a treatment tool that is not illustrated and is for extirpating a tumor or the like can be inserted into the pipe line and necessary treatment can be given to a subject by moving the treatment tool forward or backward as appropriate.

As illustrated in FIGS. 1 and 2, the imaging lens 132 (an imaging unit) is disposed on a distal-end-side surface 116A of the tip rigid part 116. An imaging element 134 (an imaging element, an imaging unit) of a complementary metal-oxide semiconductor (CMOS) type, a driving circuit 136, and an analog front end (AFE, an imaging unit) 138 are disposed behind the imaging lens 132, and these elements output an image signal. The imaging element 134 is a color imaging element and includes a plurality of pixels constituted by a plurality of light-receiving elements arranged in a matrix (arranged two-dimensionally) in a specific pattern arrangement (Bayer arrangement, X-Trans (registered trademark) arrangement, honeycomb arrangement, or the like). Each pixel of the imaging element 134 includes a microlens, a red (R), green (G), or blue (B) color filter, and a photoelectric conversion unit (a photodiode or the like). The imaging optical system 130 is capable of generating a color image from pixel signals of three colors, red, green, and blue, and is also capable of generating an image from pixel signals of any one or two colors among red, green, and blue. In the first embodiment, a description will be given of a case where the imaging element 134 is a CMOS-type imaging element, but the imaging element 134 may be of a charge coupled device (CCD) type. Each pixel of the imaging element 134 may further include a violet color filter corresponding to a violet light source 310V and/or an infrared filter corresponding to an infrared light source.

An optical image of a subject is formed on a light-receiving surface (an imaging surface) of the imaging element 134 by the imaging lens 132, converted into an electric signal, output to the medical image processing unit 200 through a signal cable that is not illustrated, and converted into a video signal. Accordingly, an endoscopic image is displayed on the monitor 400, which is connected to the medical image processing unit 200.

The illumination lenses 123A and 123B of the illumination unit 123 are provided next to the imaging lens 132 on the distal-end-side surface 116A of the tip rigid part 116. An emission end of a light guide 170, which will be described below, is disposed behind the illumination lenses 123A and 123B. The light guide 170 extends through the insertion section 104, the handheld operation section 102, and a universal cable 106, and an incidence end of the light guide 170 is located in a light guide connector 108.

The handheld operation section 102 may include a scope information recording unit that is not illustrated and that records individual information (individual information, scope information) of the endoscope 100. The individual information includes, for example, the type (direct view, side view, or the like), model, individual identification number, optical system characteristics (viewing angle, distortion, and so forth), and so forth of the endoscope 100. A processor 210 (a scope information acquiring unit, an individual information acquiring unit) is capable of acquiring the individual information and using the individual information for medical image processing. The scope information recording unit may be provided in the light guide connector 108.

In the endoscope system 10, images of a subject are sequentially captured (under control of an imaging unit and an image acquiring unit 220 (see FIG. 3)) at a determined frame rate by using the endoscope 100 having the above-described configuration, and thereby time-series medical images can be sequentially acquired. A user performs observation while inserting or removing the endoscope 100 (the insertion section 104) into or from a living body as a subject.

Configuration of Light Source Apparatus

As illustrated in FIG. 2, the light source apparatus 300 is constituted by a light source 310 for illumination, a diaphragm 330, a condenser lens 340, a light source control unit 350, and so forth, and causes observation light to enter the light guide 170. The light source 310 includes a red light source 310R, a green light source 310G, a blue light source 310B, and the violet light source 310V that radiate red narrow-band light, green narrow-band light, blue narrow-band light, and violet narrow-band light, respectively, and is capable of radiating red narrow-band light, green narrow-band light, blue narrow-band light, and violet narrow-band light. The illuminance of observation light from the light source 310 is controlled by the light source control unit 350, which is capable of changing (increasing or decreasing) the illuminance of observation light or stopping illumination as necessary.

The light source 310 is capable of emitting red narrow-band light, green narrow-band light, blue narrow-band light, and violet narrow-band light in any combination. For example, the light source 310 is capable of simultaneously emitting red narrow-band light, green narrow-band light, blue narrow-band light, and violet narrow-band light to radiate white light (normal light) as observation light, and is also capable of emitting any one or two of red narrow-band light, green narrow-band light, blue narrow-band light, and violet narrow-band light to radiate narrow-band light (special light). The light source 310 may further include an infrared light source that radiates infrared light (an example of narrow-band light). Alternatively, with use of a light source that radiates white light and a filter that allows white light and each narrow-band light to pass therethrough, white light or narrow-band light may be radiated as observation light.

Wavelength Range of Light Source

The light source 310 may be a light source that generates light in a white range or light in a plurality of wavelength ranges as the light in the white range, or may be a light source that generates light in a specific wavelength range narrower than the white wavelength range. The specific wavelength range may be a blue range or green range in a visible range, or may be a red range in the visible range. In a case where the specific wavelength range is the blue range or green range in the visible range, the specific wavelength range may include a wavelength range of 390 nm or more and 450 nm or less or a wavelength range of 530 nm or more and 550 nm or less, and the light in the specific wavelength range may have a peak wavelength in the wavelength range of 390 nm or more and 450 nm or less or the wavelength range of 530 nm or more and 550 nm or less. In a case where the specific wavelength range is the red range in the visible range, the specific wavelength range may include a wavelength range of 585 nm or more and 615 nm or less or a wavelength range of 610 nm or more and 730 nm or less, and the light in the specific wavelength range may have a peak wavelength in the wavelength range of 585 nm or more and 615 nm or less or the wavelength range of 610 nm or more and 730 nm or less.

The above-described specific wavelength range may include a wavelength range in which a light absorption coefficient is different between oxyhemoglobin and deoxyhemoglobin, and the light in the specific wavelength range may have a peak wavelength in the wavelength range in which the light absorption coefficient is different between oxyhemoglobin and deoxyhemoglobin. In this case, the specific wavelength range may include a wavelength range of $400\pm10$ nm, a wavelength range of $440\pm10$ nm, a wavelength range of $470\pm10$ nm, or a wavelength range of 600 nm or more and 750 nm or less, and the light in the specific wavelength range may have a peak wavelength in the wavelength range of $400\pm10$ nm, the wavelength range of $440\pm10$ nm, the wavelength range of $470\pm10$ nm, or the wavelength range of 600 nm or more and 750 nm or less.

The wavelength range of the light generated by the light source 310 may include a wavelength range of 790 nm or more and 820 nm or less or a wavelength range of 905 nm or more and 970 nm or less, and the light generated by the light source 310 may have a peak wavelength in the wavelength range of 790 nm or more and 820 nm or less or the wavelength range of 905 nm or more and 970 nm or less.

Alternatively, the light source 310 may include a light source that radiates excitation light whose peak is 390 nm or more and 470 nm or less. In this case, a medical image (an inside-of-living-body image) having information about fluorescence emitted by a fluorescent substance in a subject (a living body) can be acquired. In the case of acquiring a fluorescence image, a pigment for a fluorescence method (fluorescein, acridine orange, or the like) may be used.

It is preferable that the type of the light source 310 (a laser light source, a xenon light source, a light-emitting diode (LED) light source, or the like), the wavelength of the light source 310, the presence or absence of a filter for the light source 310, and so forth be determined in accordance with the type, area, organ, purpose of observation, or the like of a photographic subject. It is also preferable that, during observation, the wavelengths of observation light be combined and/or switched in accordance with the type, area, organ, purpose of observation, or the like of a photographic subject. In the case of switching the wavelength, for example, a disc-shaped filter (a rotary color filter) that is disposed in front of the light source and that is provided with a filter for transmitting or blocking light of a specific wavelength may be rotated to switch the wavelength of light to be radiated.

The imaging element used to carry out the present invention is not limited to a color imaging element in which color filters are disposed for the individual pixels, such as the imaging element 134, and may be a monochrome imaging element. In the case of using a monochrome imaging element, imaging can be performed in a frame sequential (color sequential) manner by sequentially switching the wavelength of observation light. For example, the wavelength of outgoing observation light may be sequentially switched among violet, blue, green, and red, or wide-band light (white light) may be radiated and the wavelength of outgoing observation light may be switched by using a rotary color filter (red, green, blue, violet, and the like). Alternatively, one or a plurality of types of narrow-band light (green, blue, violet, and the like) may be radiated and the wavelength of outgoing observation light may be switched by using a rotary color filter (green, blue, violet, and the like). The narrow-band light may be infrared light of two or more different wavelengths.

As a result of connecting the light guide connector 108 (see FIGS. 1 and 2) to the light source apparatus 300, observation light radiated by the light source apparatus 300 is transmitted through the light guide 170 to the illumination lenses 123A and 123B and is radiated from the illumination lenses 123A and 123B to an observation range.

Configuration of Medical Image Processing Unit

The configuration of the medical image processing unit 200 will be described with reference to FIG. 2. In the medical image processing unit 200, an image input controller 202 receives an image signal output from the endoscope 100, the processor 210 (the image acquiring unit 220: a processor, a computer, a medical image processing apparatus) performs necessary image processing thereon, and a video output unit 206 outputs a resulting image signal. Accordingly, an observation image (a medical image) is displayed on the monitor 400 (a display apparatus). A communication control unit 205 controls communication with a hospital information system (HIS), a hospital local area network (LAN), and/or an external system or network that are not illustrated. In a recording unit 207 (a recording device), an image of a subject (an endoscopic image, a medical image), a processing condition, imaging information, information indicating a result of detection of a region of interest, and the like are recorded. An audio processing unit 209 is capable of outputting a detection result or a message (audio) about a reporting process from a speaker 209A under control by the processor 210.

A read only memory (ROM) 211 is a nonvolatile storage element (a non-transitory recording medium) and stores a computer-readable code of a program that causes the processor 210 to execute various image processing methods. A random access memory (RAM) 212 is a storage element for temporary storage in various processing operations and can be used as a buffer at the time of acquiring an image.

A user is able to provide an instruction to execute medical image processing or designate a necessary condition for the execution via the operation unit 208 (see FIG. 9), and a display control unit 230 (see FIG. 3) is able to cause the monitor 400 to display a screen at the time of the instruction, a detection result of a region of interest, and the like.

Functions of Processor

Figure 3:
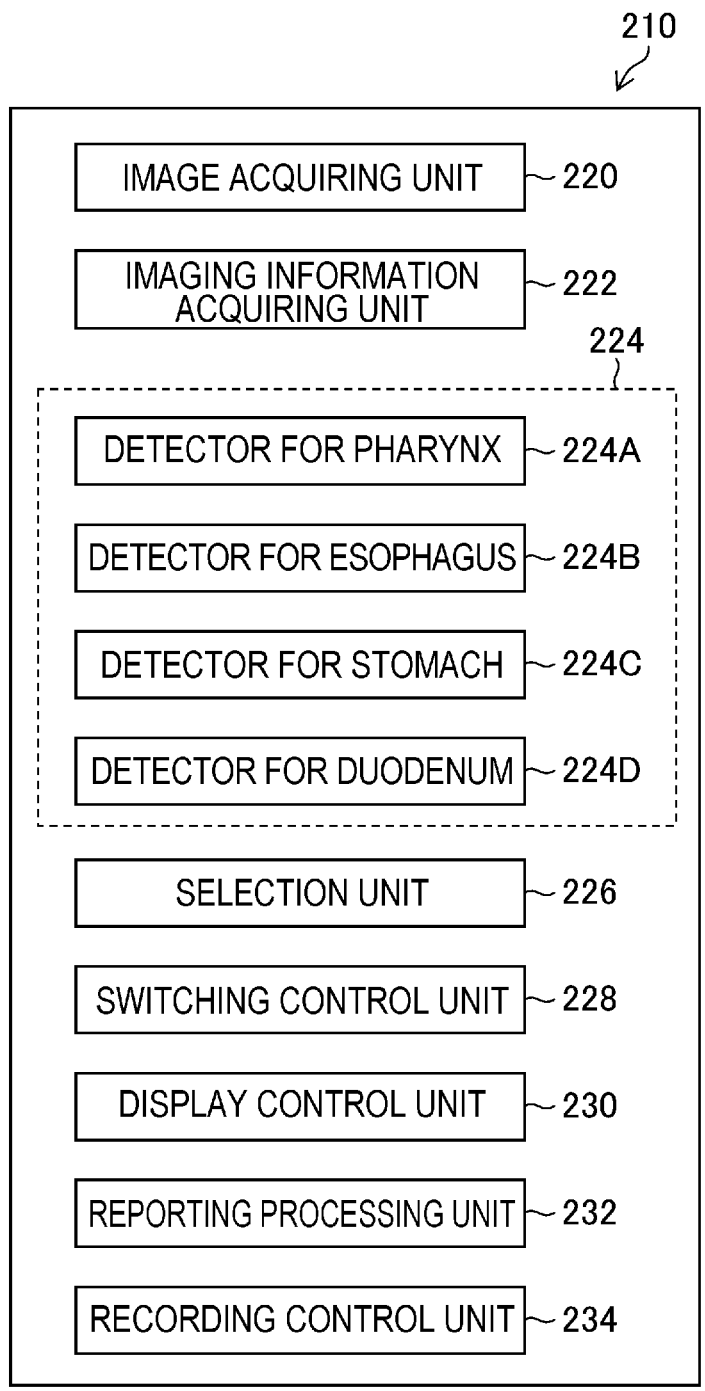
FIG. 3 is a block diagram illustrating a functional configuration of a processor.

FIG. 3 is a block diagram illustrating a functional configuration of the processor 210. The processor 210 includes the image acquiring unit 220 (an image acquiring unit), an imaging information acquiring unit 222 (an imaging information acquiring unit), a detector 224 (a plurality of detectors), a selection unit 226 (a selection unit), a switching control unit 228 (a switching control unit), a display control unit 230 (a display control unit), a reporting processing unit 232 (a reporting processing unit), and a recording control unit 234 (a recording control unit). The detector 224 detects a region of interest from a medical image, and includes a plurality of detectors for different organs or areas (a detector for pharynx 224A, a detector for esophagus 224B, a detector for stomach 224C, and a detector for duodenum 224D) in the aspect illustrated in FIG. 3. These detectors can be constituted by a hierarchical neural network such as a convolutional neural network (CNN), as will be described below with reference to FIGS. 4A, 4B, and 5.

The processor 210 (the image acquiring unit 220 and so forth) is capable of performing, with the above-described functions, calculation of a feature quantity of a medical image, processing of emphasizing or reducing a component of a specific frequency band, and processing of emphasizing or deemphasizing a specific target (a region of interest, blood vessels at a desired depth, or the like). The processor 210 may include a special-light image acquiring unit that acquires a special-light image having information about a specific wavelength range on the basis of a normal-light image that is acquired by radiating light in the white range or light in a plurality of wavelength ranges as the light in the white range. In this case, a signal in the specific wavelength range can be acquired through computation based on color information of RGB (R: red, G: green, B: blue) or CMY (C: cyan, M: magenta, Y: yellow) included in the normal-light image. In addition, the processor 210 may include a feature quantity image generating unit that generates a feature quantity image through computation based on at least one of a normal-light image that is acquired by radiating light in the white range or light in a plurality of wavelength ranges as the light in the white range or a special-light image that is acquired by radiating light in a specific wavelength range, and may acquire and display the feature quantity image as a medical image.

The image acquiring unit 220 (a processor) may acquire, as a medical image, an endoscopic image (a medical image) captured by using observation light in a wavelength range suitable for the organ or area as an observation target, and the display control unit 230 may cause the monitor 400 (a display apparatus) to display a result of recognition for the medical image captured by using the observation light in the wavelength range. For example, an image captured by using white light (normal light) can be provided for detection (recognition) in the case of the stomach, and an image captured by using special light (blue narrow-band light), such as BLI (Blue Laser Imaging: registered trademark), can be provided for detection (recognition) in the case of the esophagus. In accordance with an area, the image acquiring unit 220 may acquire an image captured by using special light, such as LCI (Linked Color Imaging: registered trademark), and subjected to image processing (in the case of LCI, a difference in chroma or hue of a color close to a mucosal color is extended).

Medical image processing performed using the above-described functions will be described below in detail.

Detector Using Trained Model

The above-described detector can be constituted by using a trained model constituted through machine learning (a model trained by using an image set constituted by captured images of a living body), such as a convolutional neural network (CNN) or a support vector machine (SVM). Hereinafter, a description will be given of a layer configuration in a case where the detector 224 (the detector for pharynx 224A to the detector for duodenum 224D) is constituted by a CNN.

Examples of Layer Configuration of CNN

Figure 4A:
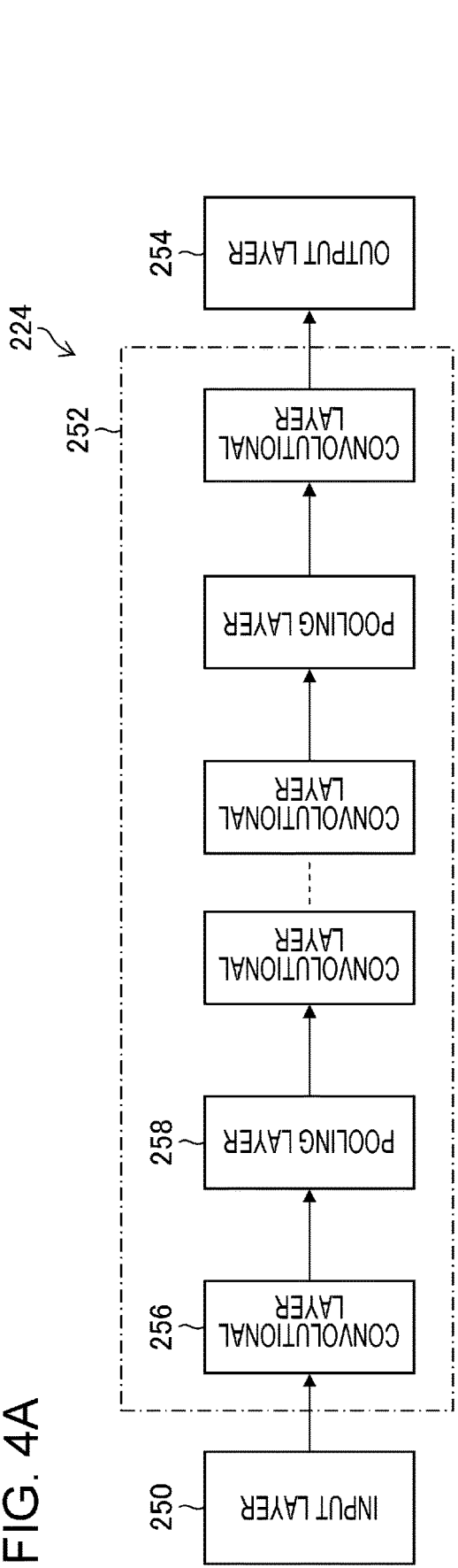
FIGS. 4A and 4B are diagrams illustrating examples of a layer configuration of a detector.
Figure 4B:
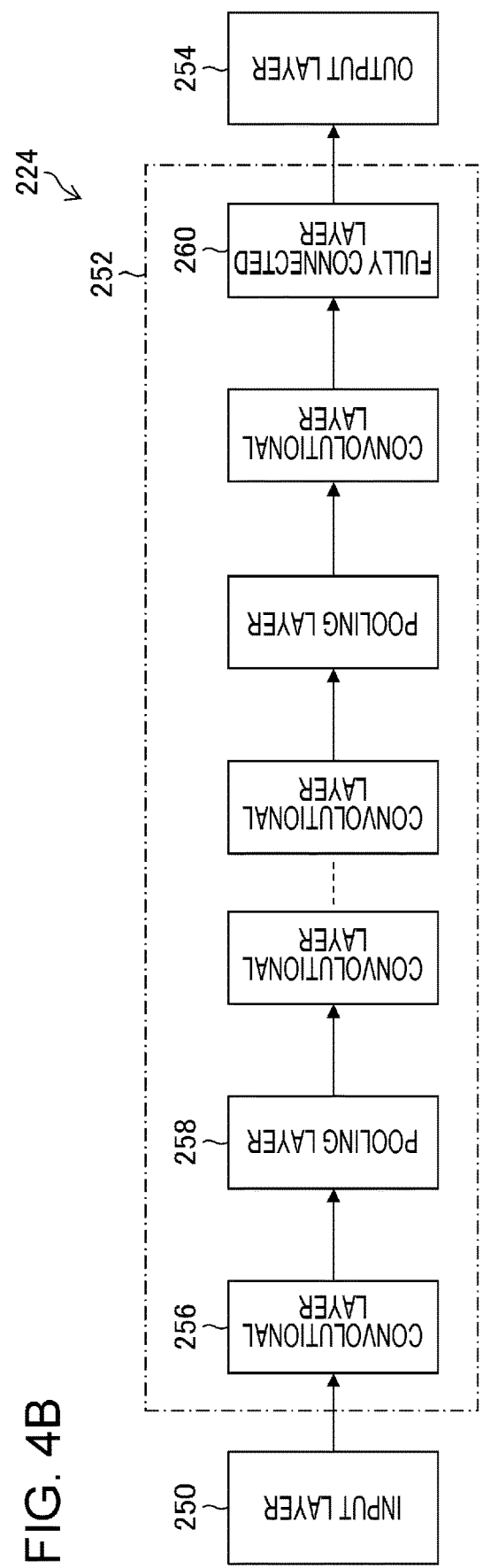

FIGS. 4A and 4B are diagrams illustrating examples of the layer configuration of the detector 224. In the example illustrated in FIG. 4A, the detector 224 includes an input layer 250, an intermediate layer 252, and an output layer 254. The input layer 250 receives an endoscopic image (a medical image) acquired by the image acquiring unit 220 and outputs a feature quantity. The intermediate layer 252 includes convolutional layers 256 and pooling layers 258, and receives the feature quantity output from the input layer 250 and calculates another feature quantity. These layers each have a structure in which a plurality of "nodes" are connected by "edges" and hold a plurality of weight parameters. The values of the weight parameters change as learning progresses. The detector 224 may include a fully connected layer 260 as in the example illustrated in FIG. 4B. The layer configuration of the detector 224 is not limited to the configuration in which the convolutional layers 256 and the pooling layers 258 are alternately arranged, and may include a plurality of consecutive convolutional layers 256 or pooling layers 258 (for example, convolutional layers 256). Alternatively, a plurality of consecutive fully connected layers 260 may be included.

Processing in Intermediate Layer

The intermediate layer 252 calculates a feature quantity through convolutional operation and pooling processing. The convolutional operation performed in the convolutional layer 256 is processing of acquiring a feature map through convolutional operation using a filter, and plays a role in feature extraction such as edge extraction from an image. As a result of the convolutional operation using a filter, one-channel (one) "feature map" is generated for one filter. The size of the "feature map" is scaled down by convolution and is reduced as convolution is performed in each layer. The pooling processing performed in the pooling layer 258 is processing of reducing (or enlarging) the feature map output through the convolutional operation to create a new feature map, and plays a role in giving robustness so that the extracted feature is not affected by parallel movement or the like. The intermediate layer 252 can be constituted by one or a plurality of layers that perform these processing operations.

Figure 5:
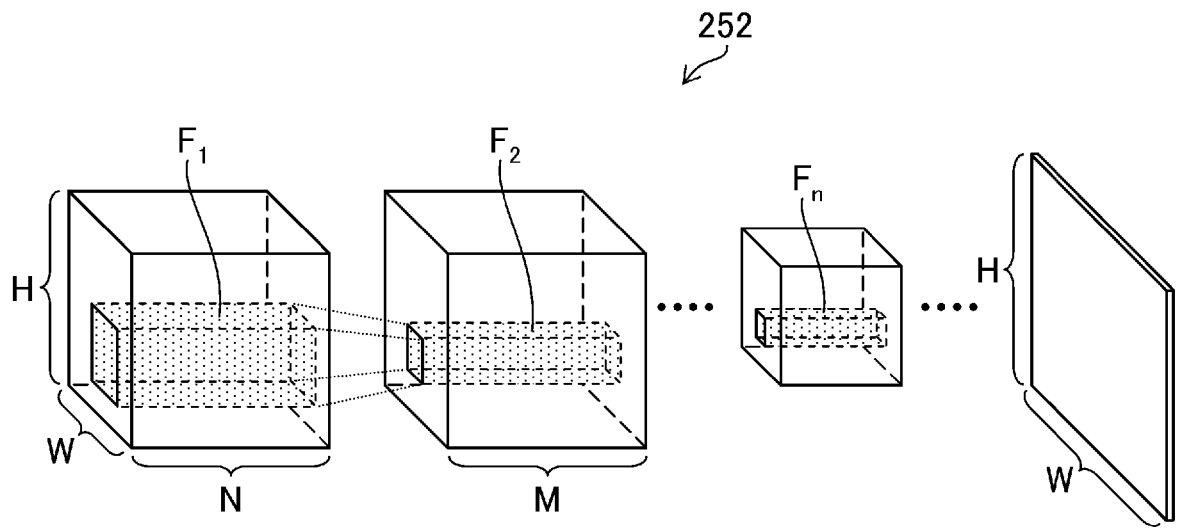
FIG. 5 is a diagram illustrating a state of convolutional operation in a detector.

FIG. 5 is a diagram illustrating a state of convolutional operation in the detector 224 illustrated in FIGS. 4A and 4B. In the first convolutional layer of the intermediate layer 252, convolutional operation of an image set constituted by a plurality of medical images (a learning image set in the case of learning, and a recognition image set in the case of recognition such as detection) and a filter $F_1$ is performed. The image set is constituted by N (N-channel) images each having an image size in which the height is represented by H and the width is represented by W. In the case of inputting normal-light images, the images constituting an image set are three-channel images of red (R), green (G), and blue (B). The filter $F_1$ convoluted with this image set has a filter size of 5×5×N in the case of the filter having size 5 (5×5), for example, because the image set has N channels (N images). As a result of convolutional operation using the filter $F_1$, one-channel (one) "feature map" is generated for one filter $F_1$. A filter $F_2$ used in the second convolutional layer has a filter size of 3×3×M in the case of the filter having size 3 (3×3), for example.

As in the first convolutional layer, in the second to n-th convolutional layers, convolutional operations using filters $F_2$ to $F_n$ are performed, respectively. The size of the "feature map" in the n-th convolutional layer is smaller than the size of the "feature map" in the second convolutional layer because scaling-down is performed in the convolutional layers or pooling layers in the preceding stages.

In the layers of the intermediate layer 252, lower-order feature extraction (extraction of edges or the like) is performed in a convolutional layer near the input side, and higher-order feature extraction (extraction of features about the shape, structure, and the like of an object) is performed near the output side. In the case of performing segmentation for the purpose of measurement or the like, scaling-up is performed in a convolutional layer in a latter-half portion, and the "feature map" having the same size as the input image set can be obtained in the last convolutional layer. On the other hand, in the case of performing object detection, it is sufficient to output position information and thus scaling-up is not necessary.

The intermediate layer 252 may include a layer for performing batch normalization in addition to the convolutional layers 256 and the pooling layers 258. Batch normalization processing is the processing of normalizing a data distribution in units of mini batches for performing learning, and plays a role in quickly performing learning, reducing dependency on an initial value, suppressing overtraining, and so forth.

Processing in Output Layer

The output layer 254 is a layer that detects the position of a region of interest depicted in an input medical image (a normal-light image, a special-light image) on the basis of the feature quantity output from the intermediate layer 252 and outputs the result thereof. In the case of performing segmentation, the output layer 254 grasps the position of a region of interest depicted in an image in the pixel level by using the "feature map" acquired from the intermediate layer 252. That is, the output layer 254 is capable of detecting, for each pixel of an endoscopic image, whether or not the pixel belongs to the region of interest, and outputting the detection result. On the other hand, in the case of performing object detection, determination in units of pixels is not necessary, and the output layer 254 outputs position information on the target.

The output layer 254 may execute discrimination (classification) of a lesion and output a discrimination result. For example, the output layer 254 may classify an endoscopic image into three categories "neoplastic", "non-neoplastic", and "others", and may output, as a discrimination result, three scores corresponding to "neoplastic", "non-neoplastic", and "others" (the sum of the three scores is 100%), or may output a classification result in a case where the endoscopic image can be clearly classified from the three scores. In the case of outputting a discrimination result, the intermediate layer 252 or the output layer 254 may or may not include a fully connected layer as the last one or plural layers (see FIG. 4B).

The output layer 254 may output a measurement result of a region of interest. In the case of performing measurement by using the CNN, for example, the region of interest as a target can be segmented in the above-described manner and then measurement can be performed by the processor 210 or the like on the basis of the result thereof. Alternatively, a measurement value of the region of interest as a target can be output directly from the detector 224. In the case where the measurement value is directly output, the image is caused to learn the measurement value, and thus regression of the measurement value occurs.

In the case of using the CNN having the above-described configuration, it is preferable to perform, in a learning procedure, a process of comparing a result output from the output layer 254 with a correct answer of recognition for the image set to calculate loss (error), and updating the weight parameters in the intermediate layer 252 from the layer on the output side toward the layer on the input side so that the loss is reduced (backpropagation).

Recognition Using Method Other than CNN

The detector 224 may perform detection by using a method other than the CNN. For example, a region of interest can be detected on the basis of a feature quantity of pixels of an acquired medical image. In this case, the detector 224 divides a detection target image into, for example, a plurality of rectangular regions, sets the rectangular regions obtained through the division as local regions, calculates, for each local region in the detection target image, a feature quantity (for example, hue) of pixels in the local region, and determines a local region having a specific hue among the local regions as a region of interest. Similarly, the detector 224 may perform classification or measurement based on a feature quantity.

Modification of Configuration of Detector

Figure 6:
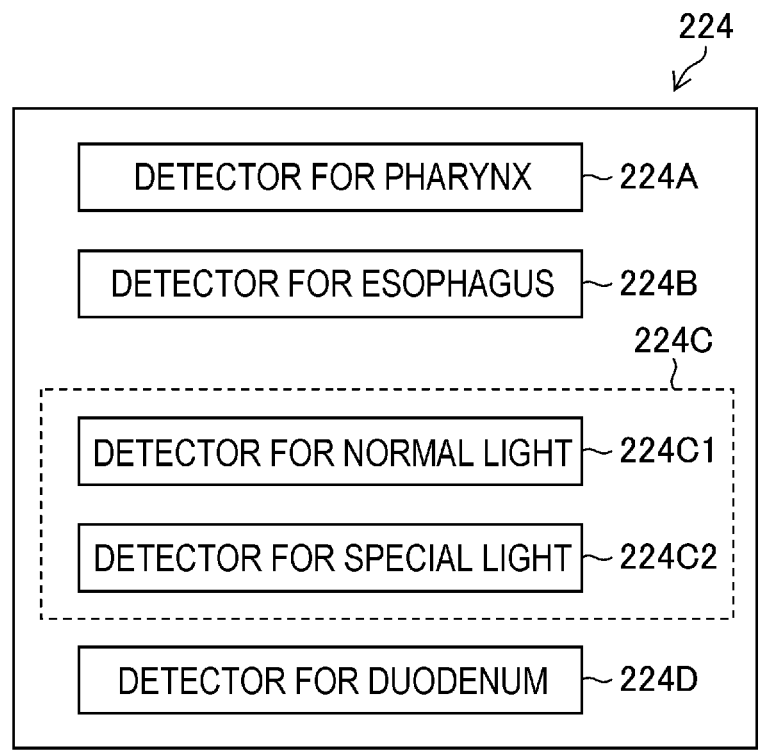
FIG. 6 is a diagram illustrating a modification of the configuration of the detector.

The detectors constituting the detector 224 (the detector for pharynx 224A to the detector for duodenum 224D) may each be constituted by a plurality of detectors for observation light beams in different wavelength ranges. FIG. 6 is a diagram illustrating a modification of the configuration of the detector (an example in which the detector for stomach 224C includes a detector for normal light 224C1 and a detector for special light 224C2). Preferably, the detector for normal light 224C1 and the detector for special light 224C2 are trained models constituted through machine learning using normal-light images and special-light images, respectively.

Figure 7:
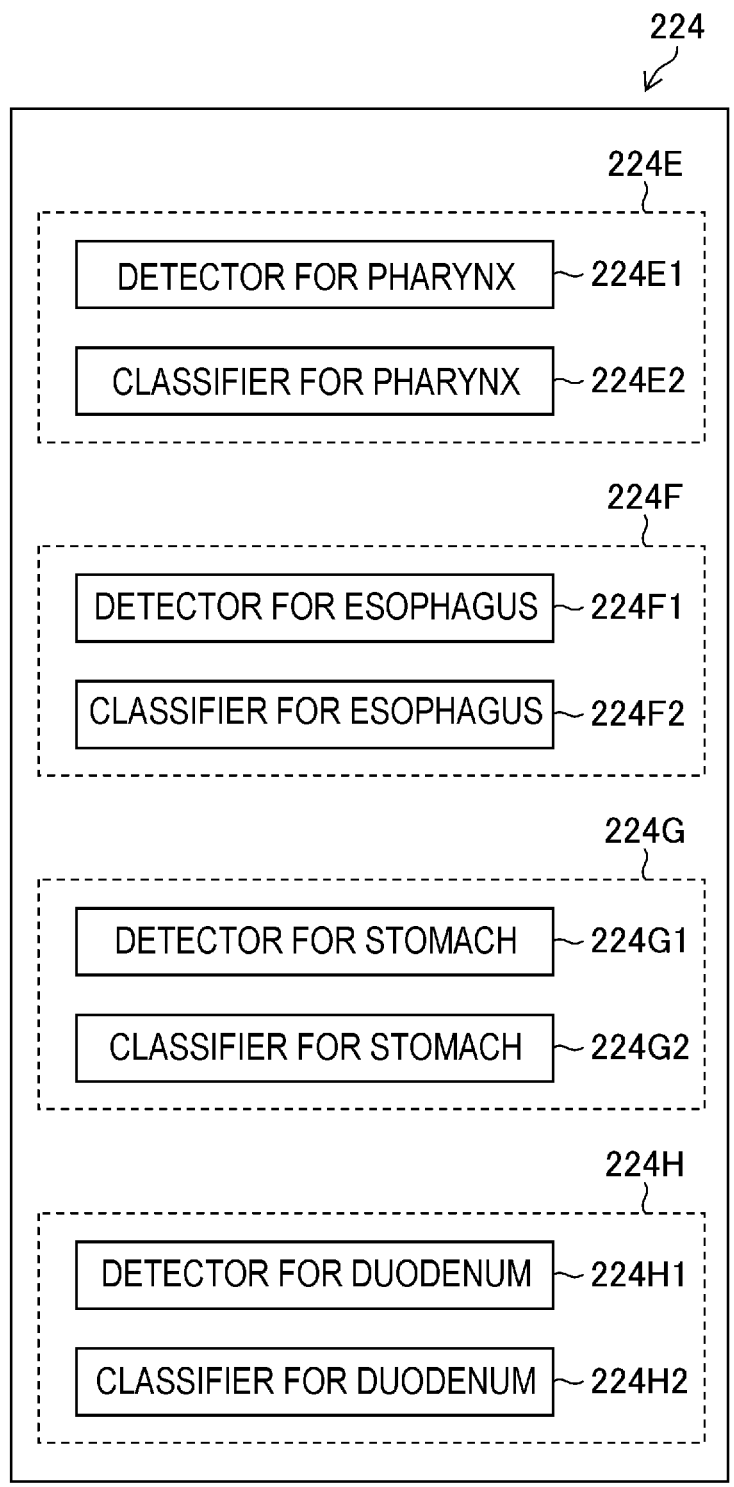
FIG. 7 is a diagram illustrating an example in which a recognizer is constituted by a detector and a classifier.

Although the configuration of the detector has mainly been described with reference to FIG. 4A to FIG. 6, a classifier or a measurer may be provided instead of or in addition to the detector in the present invention. For example, as illustrated in FIG. 7, a recognizer for pharynx 224E may be constituted by a detector for pharynx 224E1 and a classifier for pharynx 224E2, a recognizer for esophagus 224F may be constituted by a detector for esophagus 224F1 and a classifier for esophagus 224F2, a recognizer for stomach 224G may be constituted by a detector for stomach 224G1 and a classifier for stomach 224G2, and a recognizer for duodenum 224H may be constituted by a detector for duodenum 224H1 and a classifier for duodenum 224H2. These classifiers (discriminators) or measurers can employ a layer configuration similar to that of the above-described detector. Alternatively, a detector, a classifier, or a measurer may be separated for normal light and special light as in the example in FIG. 6.

Implementation of Functions by Various Types of Processors

The functions of the above-described processor 210 can be implemented by using various types of processors and a recording medium. The various types of processors include, for example, a central processing unit (CPU), which is a general-purpose processor that executes software (program) to implement various functions. Also, the various types of processors include a graphics processing unit (GPU), which is a processor dedicated to image processing, and a programmable logic device (PLD), which is a processor whose circuit configuration is changeable after manufacturing, such as a field programmable gate array (FPGA). In the case of performing processing on an image as in the present invention, the configuration using a GPU is effective. Furthermore, the various types of processors include a dedicated electric circuit which is a processor having a circuit configuration designed exclusively for executing specific processing, such as an application specific integrated circuit (ASIC).

The function of each unit may be implemented by one processor or may be implemented by a plurality of processors of the same type or different types (for example, a combination of a plurality of FPGAs, a combination of a CPU and an FPGA, or a combination of a CPU and a GPU). A plurality of functions may be implemented by one processor. A first example of implementing a plurality of functions by one processor is that a combination of one or more CPUs and software constitute one processor and the one processor implements the plurality of functions, as represented by a computer. A second example is that a processor that implements the functions of an entire system by one integrated circuit (IC) chip is used, as represented by a system on chip (SoC). In this way, various functions are configured as a hardware structure by using one or more of the above-described various types of processors. Furthermore, the hardware structure of the various types of processors is, more specifically, electric circuitry formed by combining circuit elements such as semiconductor elements. The electric circuitry may be electric circuitry that implements the above-described functions by using logical disjunction, logical conjunction, logical negation, exclusive disjunction, and logical operation as a combination thereof.

When the above-described processor or electric circuitry executes the software (program), the code of the software to be executed that is readable by a computer (for example, the various types of processors or electric circuitry constituting the processor 210, and/or a combination thereof) is stored in a non-transitory recording medium, such as the read only memory (ROM) 211, and the computer refers to the software. The software stored in the non-transitory recording medium includes a medical image processing program for executing the medical image processing method according to the present invention and data used for the execution (data used to set a display mode or a reporting mode, a weight parameter used in the detector 224, and so forth). The code may be recorded on a non-transitory recording medium, such as a magneto-optical recording device of various types or a semiconductor memory, instead of the ROM 211. In the processing using the software, the random access memory (RAM) 212 may be used as a transitory storage region, for example, and data stored in an electrically erasable and programmable read only memory (EEPROM) that is not illustrated can be referred to, for example. The recording unit 207 may be used as a "non-transitory recording medium".

Information Recorded in Recording Unit

In the recording unit 207, an endoscopic image (a medical image), a processed endoscopic image (a processed medical image) on which image processing has been performed, imaging information (information indicating an imaging position and/or an imaging direction of the endoscopic image), a detection result, a processing condition (a condition for performing detection or reporting), and the like are recorded. Other information may also be recorded. The recording control unit 234 records these pieces of information in association with each other.

Medical Image Processing

Figure 8:
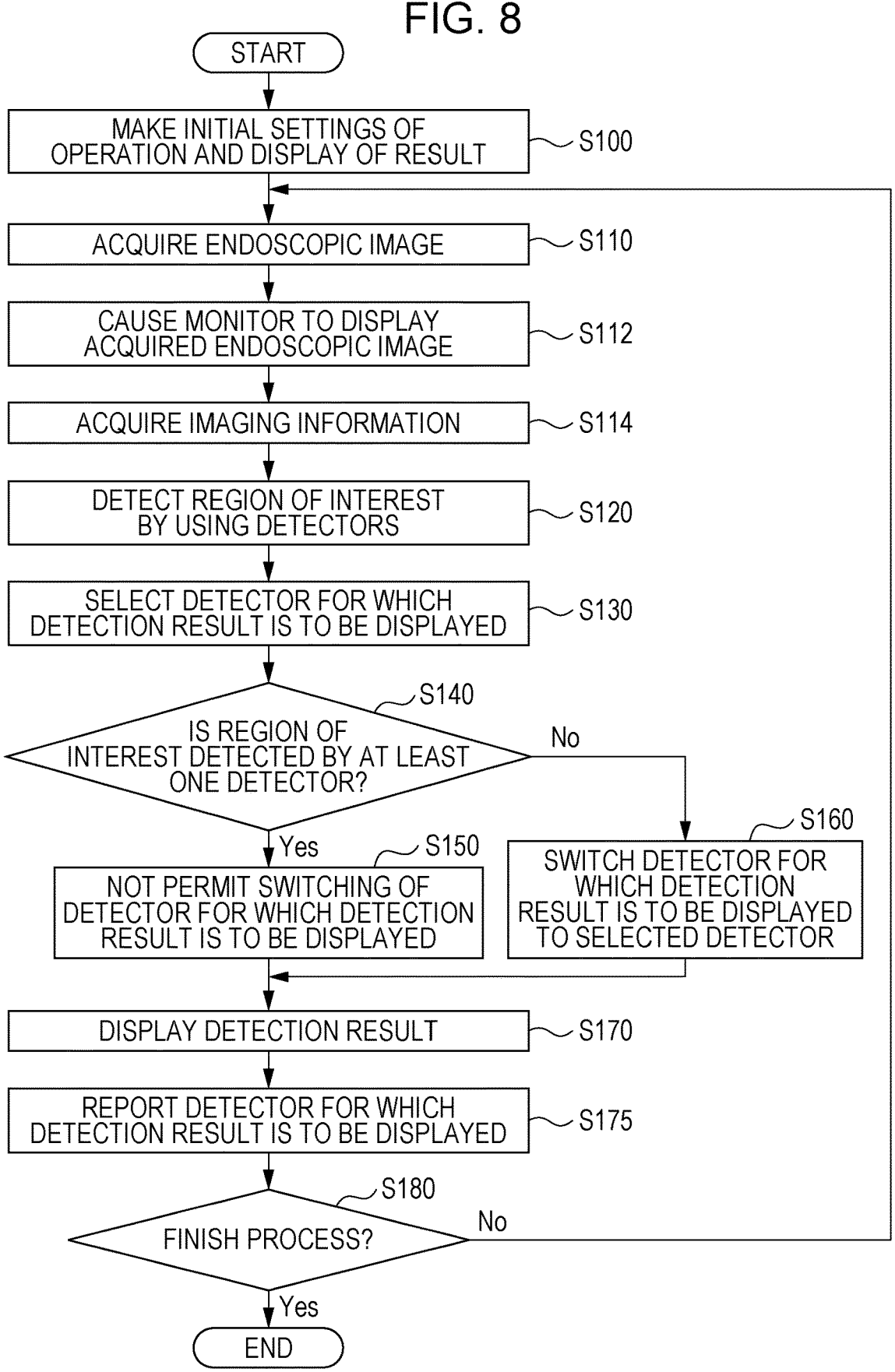
FIG. 8 is a flowchart illustrating a procedure of a medical image processing method according to the first embodiment.

Medical image processing in the endoscope system 10 having the above-described configuration (execution of the medical image processing method and the medical image processing program according to the present invention) will be described. FIG. 8 is a flowchart illustrating a procedure of medical image processing according to the first embodiment. Hereinafter, a description will be given of the case of detecting a region of interest by the detector 224. Also in the case of performing classification or measurement, processing can be performed in a similar manner. The procedure described below is an example, and the order may be changed as necessary.

Initial Setting

The processor 210 sets conditions necessary for executing the medical image processing method/program (step S100: an initial setting step) on the basis of a user operation via the operation unit 208 and/or preset processing conditions (for example, default processing conditions). For example, the processor 210 designates a detector to be operated, and sets the mode of displaying or reporting a detection result (setting of displaying or hiding; characters, figures, symbols, and the colors thereof to be displayed, or the like). The processor 210 may cause all of the plurality of detectors constituting the detector 224 to operate (in this case, display of a detection result may be performed for one or some of the detectors), or may cause one or some of the detectors to operate and stop a detector (detection process) for which a detection result is not to be displayed on the monitor 400 (a display apparatus). The user is able to set processing conditions by turning ON/OFF radio buttons or inputting numerical values on the screen illustrated in FIG. 9 (which does not illustrate the setting of all processing conditions) via the operation unit 208, for example. The processor 210 is capable of setting processing conditions not only at the start of processing but also during execution of the steps described below.

Acquisition of Endoscopic Image

The image acquiring unit 220 (a processor, an image acquiring unit) acquires an endoscopic image (a medical image) captured in a living body of a subject (step S110: an image acquisition process, an image acquisition step). The image acquiring unit 220 is capable of acquiring a time-series endoscopic image in real time by performing sequential imaging of the inside of the living body as the subject at a predetermined frame rate by using the imaging unit (the imaging lens 132, the imaging element 134, the AFE 138, and so forth) of the endoscope 100. The image acquiring unit 220 may acquire, in non-real time, an endoscopic image that has already been captured and recorded. For example, the image acquiring unit 220 may acquire an endoscopic image or a processed endoscopic image recorded in the recording unit 207, or may acquire an image from an external apparatus or system via the communication control unit 205. The display control unit 230 (a processor, a display control unit) causes the monitor 400 to display the acquired endoscopic image (step S112: a display control process, a display control step).

Acquisition of Imaging Information

The imaging information acquiring unit 222 (a processor) acquires imaging information (information indicating an imaging position and/or an imaging direction of an endoscopic image) (step S114: an imaging information acquisition process, an imaging information acquisition step). The imaging position may be defined in units of organs (pharynx, esophagus, stomach, duodenum, and so forth), or may be defined in units of portions of one organ (in the case of stomach, cardia, fundus, gastric body, pylorus portion, pylorus, and so forth). The imaging direction may be defined by "which position is being observed from which position" (for example, the gastric body is observed from the cardia), or may be defined by the direction of the field of view (for example, in the case of an ultrasonic endoscope, a pancreas long-axis direction or uniaxial direction).

The imaging information acquiring unit 222 is capable of acquiring imaging information by analyzing an endoscopic image, and is also capable of acquiring imaging information by using information input by a user or information of an external apparatus (a determination apparatus) that determines the state of the endoscope 100 (an imaging apparatus). The imaging information acquiring unit 222 is capable of determining, on the basis of the conditions set in step S100, which method is to be used to acquire imaging information. In the case of analyzing an endoscopic image, the imaging information acquiring unit 222 may perform analysis by using a feature quantity, such as the color, of a photographic subject, or may use a trained model for analysis (CNN, SVM, or the like). In the case of using a user input, the imaging information acquiring unit 222 is capable of using information input via the operation unit 208. As the above-described "external apparatus", an apparatus (a determination apparatus) that observes the imaging position and/or the imaging direction of the endoscope 100 by using an electromagnetic wave, an ultrasonic wave, radiation, or the like can be used (see the example in FIG. 15 described below).

Detection of Region of Interest

The detector 224 (a processor) detects a region of interest from an endoscopic image (a medical image) by using the plurality of detectors constituting the detector 224 (step S120: a detection process, a detection step). The processor 210 is capable of performing a plurality of detection processes by using a plurality of detectors among the detectors constituting the detector 224. In detection of a region of interest, the detector 224 is capable of grasping the position of the region of interest in an image in the pixel level (i.e., detecting, for each pixel of the endoscopic image, whether the pixel belongs to the region of interest) by using the above-described "feature map", and outputting a detection result. Examples of a region of interest (a region of concern) detected by the endoscope system 10 include a polyp, a cancer, a large intestine diverticulum, inflammation, a treatment scar (an endoscopic mucosal resection (EMR) scar, an endoscopic submucosal dissection (ESD) scar, a clip portion, or the like), a bleeding point, a perforation, blood vessel atypia, or various treatment tools. In the case of an ultrasonic apparatus such as an ultrasonic endoscope, an organ or a vessel may be detected as a region of interest.

Selection of Detection Process (Detector) for which Detection Result is to be Displayed The selection unit 226 (a processor) selects, from among the plurality of detectors (detection processes) constituting the detector 224, a detector for which a detection result is to be displayed on the monitor 400 (a display apparatus) (step S130: a selection process, a selection step). The selection unit 226 may select a detector on the basis of the above-described imaging information, or may select a detector on the basis of the wavelength range of observation light (for example, normal light or special light; see the configuration in FIG. 6) or the purpose of observation. In a case where the processor 210 includes a plurality of types of recognizers (for example, a detector, a classifier, a measurer, and the like; see the configuration in FIG. 7), a specific type of recognizer may be selected. As a result of switching the detector (recognizer) in this way, an appropriate diagnosis assistance function (a detection result obtained by the detector) can be provided to the user.

The selection unit 226 selects at least one detector (or a plurality of detectors) for which a detection result is to be displayed. In an initial state, the selection unit 226 may select a specific detector (for example, the detector for duodenum 224D).

Control of Whether or Not to Permit Switching

In the case of switching between detectors (recognizers) on the basis of imaging information or the like in the above-described manner, there is a risk of switching being performed at an inappropriate timing. For example, in the case of performing switching in response to an organ being recognized in a medical image, there is a possibility that erroneous switching is performed due to an error occurring in the recognition of the organ. Accordingly, in the present invention, in order to reduce such a risk, switching control (whether or not to permit switching) is performed in consideration of not only imaging information or the like but also a detection situation of a region of interest.

Specifically, the switching control unit 228 (a processor) controls whether or not to permit switching of a detector (a detection process) for which a detection result is to be displayed, in accordance with a detection state of a region of interest in the plurality of detectors (detection processes) constituting the detector 224 (a switching control process, a switching control step).

First, the switching control unit 228 determines whether a region of interest is detected by at least one detector (detection process) (step S140: a switching control process, a switching control step). If an affirmative determination is made, that is, if a region of interest is detected by at least one detector (detection process), the switching control unit 228 does not permit switching of the detector (detection process) for which a detection result is to be displayed (step S150: a switching control process, a switching control step). If a negative determination is made, that is, if a region of interest is not detected, the switching control unit 228 permits switching (step S160: a switching control process, a switching control step). In a case where switching is not permitted, the switching control unit 228 is capable of selecting a detector selected immediately previously (a detector selected by a determined time before, a detector selected a determined number of frames before, a detector selected in initial setting, or the like).

In the above-described switching control, the switching control unit 228 does not permit switching of the detector for which a detection result is to be displayed on the display apparatus, while at least one detector (detection process) is detecting a region of interest. That is, it is determined that "when a region of interest is present in an endoscopic image, the possibility that an observation situation is changing is low (thus, the necessity of switching the detector is low)". Actually, in the case of detecting a lesion or the like from an endoscopic image, the possibility that a lesion is present in an image is low during transition of an organ as an observation target. Also, in the scene of detecting an organ from an ultrasound image, the possibility that the detector determines that "a region of interest is present" is low because an organ is not appropriately depicted during transition of the observation situation. In the case of detecting a lesion, such as a cancer, as a region of interest, the organ is unnaturally seen during detection of the lesion in many cases, and there is a high risk that an error occurs during the process of recognizing the organ. This is because, when a detector (recognizer) is caused to learn by machine learning, learning is performed mainly using images of a normal organ.

Under such a situation, in the present invention, whether or not to permit switching is controlled in accordance with the detection state of a region of interest as described above. Accordingly, the risk of an error occurring during a recognition process can be reduced, and the diagnosis assistance function can be appropriately switched.

If the detector as a switching destination is not operating, the switching control unit 228 (a processor) causes the detector to start a detection process. In addition, the switching control unit 228 is capable of stopping the operation (detection process) of the detector for which a detection result is not to be displayed on the monitor 400 (a display apparatus) to reduce a load on a memory or the like (the detector may be kept operating without being stopped as necessary).

Figure 10A:
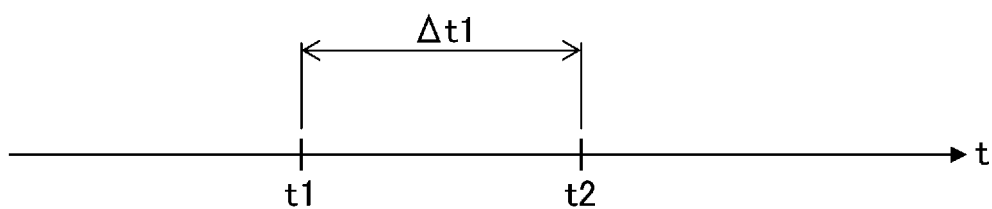
FIGS. 10A and 10B are diagrams illustrating examples of switching control around a timing at which a region of interest is detected.
Figure 10B:
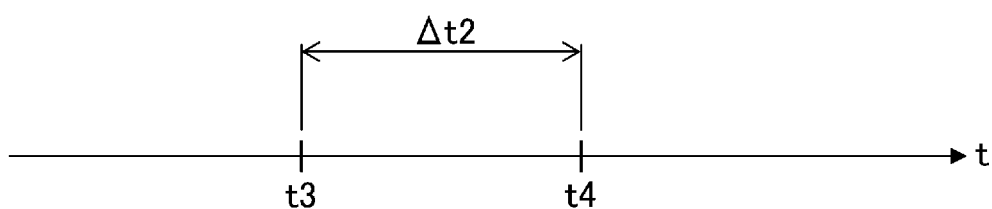

The switching control unit 228 (a processor) may control whether or not to permit switching not only at a timing at which a region of interest is detected but also around the timing. Specifically, the switching control unit 228 is capable of prohibiting switching around a time at which it is determined that "a region of interest is present in an endoscopic image (a medical image)" in at least one of the plurality of detectors (detection processes), and is capable of permitting switching around a time at which it is determined that "a region of interest is absent in an endoscopic image" in at least one of the plurality of detectors. FIGS. 10A and 10B illustrate examples of such switching control. FIG. 10A illustrates a mode in which switching is not permitted during a period Δt1 until time t2 if it is determined at time t1 that "a region of interest is present in an endoscopic image". FIG. 10B illustrates a mode in which switching is permitted during a period Δt2 until time t4 if it is determined at time t3 that "a region of interest is absent in an endoscopic image".

Display of Detection Result and Reporting of Switching

The display control unit 230 (a processor) causes the monitor 400 (a display apparatus) to display at least one detection result among detection results obtained by the plurality of detectors (detection processes) on the basis of a result of the above-described switching control (step S170: a display control process, a display control step). The reporting processing unit 232 (a processor) executes a reporting process of reporting, to a user, the detector (the detection process) for which a detection result is to be displayed (step S175: a reporting process, a reporting step). Upon switching of the detector for which a detection result is to be displayed, the reporting processing unit 232 may report that the switching has been performed.

The processor 210 repeats the above-described process until it is determined that "the process is to be finished" (step S180) as a result of the end of acquisition of an endoscopic image or a user operation.

Examples of Display and Reporting

Figure 11A:
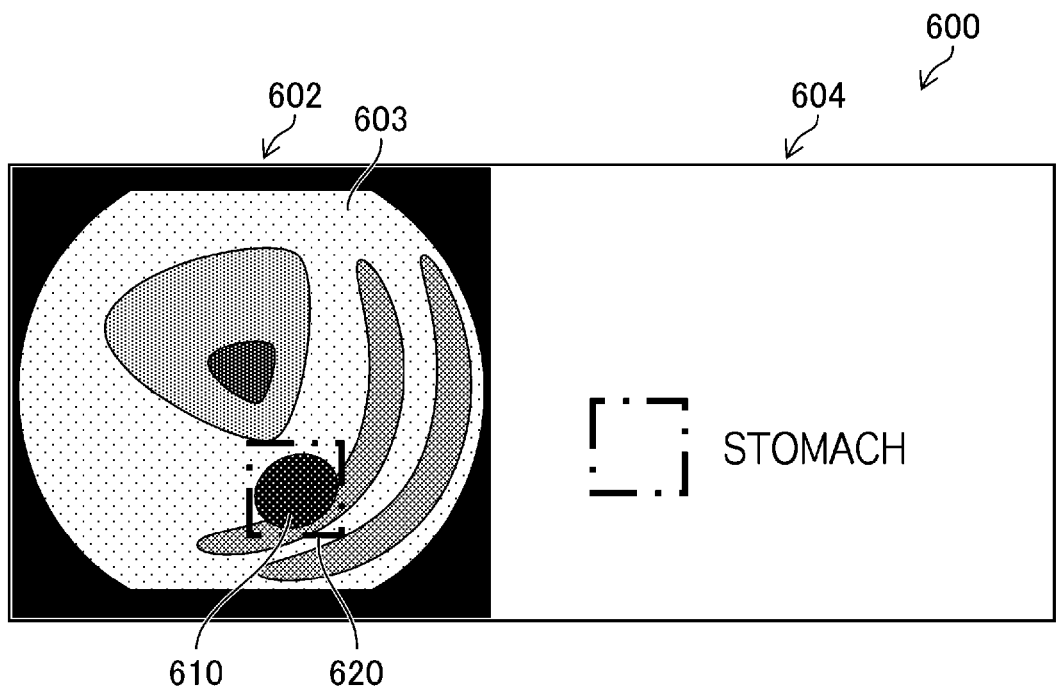
FIGS. 11A and 11B are diagrams illustrating examples of display and reporting of a detection result of a region of interest.
Figure 11B:
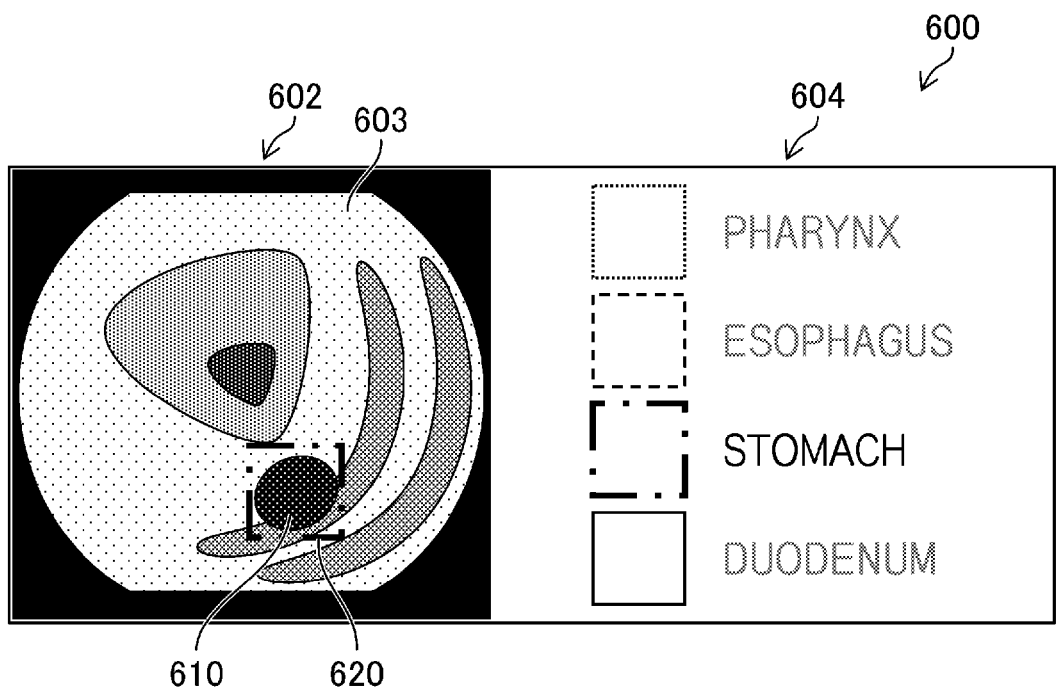

FIGS. 11A and 11B are diagrams illustrating examples of display and reporting of a detection result of a region of interest (a screen 600 of the monitor 400 (a display apparatus)). In FIG. 11A, the display control unit 230 and the reporting processing unit 232 (a processor) display an endoscopic image 603 in an image display region 602 on the left side of the screen. A region of interest 610 is detected in the endoscopic image 603, and the display control unit 230 and the reporting processing unit 232 display a bounding box 620 in a superimposed manner on the region of interest 610. In a reporting region 604 on the right side of the screen, emphasized display (discriminating display) is provided to indicate that the bounding box 620 is a detection result obtained by the detector for stomach 224C ("STOMACH" is displayed) (an example of a reporting process). In the example illustrated in FIG. 11A, only the detector for which a detection result is displayed (the detector for stomach 224C) is operating, and the fact (a list of detectors that are operating) is reported (displayed) in the reporting region 604 (a reporting process), whereas the detectors for which a detection result is not displayed (the detector for pharynx 224A, the detector for esophagus 224B, and the detector for duodenum 224D) are not displayed.

On the other hand, in FIG. 11B, all the detectors are operating, and the fact is reported (displayed in a list view) in the reporting region 604 (a reporting process). Furthermore, in the reporting region 604, the detector for stomach 224C for which a detection result is displayed in the image display region 602 is emphasized, and the other detectors are grayed out (a reporting process).

In the examples illustrated in FIGS. 11A and 11B, the individual detectors are discriminatively displayed using characters and the types of lines of the bounding boxes. Alternatively, in addition to or instead of the character or the type of line, the color or brightness of the bounding box may vary among the detectors. That is, the display control unit 230 and the reporting processing unit 232 (the processor 210) are capable of varying, according to a detector, the display mode of a detection result to be displayed on the monitor 400 (a display apparatus) (the same applies to the modes illustrated in FIGS. 12 and 13). Such display in the image display region 602 and the reporting region 604 enables the user to easily grasp the detector for which a detection result is displayed.

Figure 12:
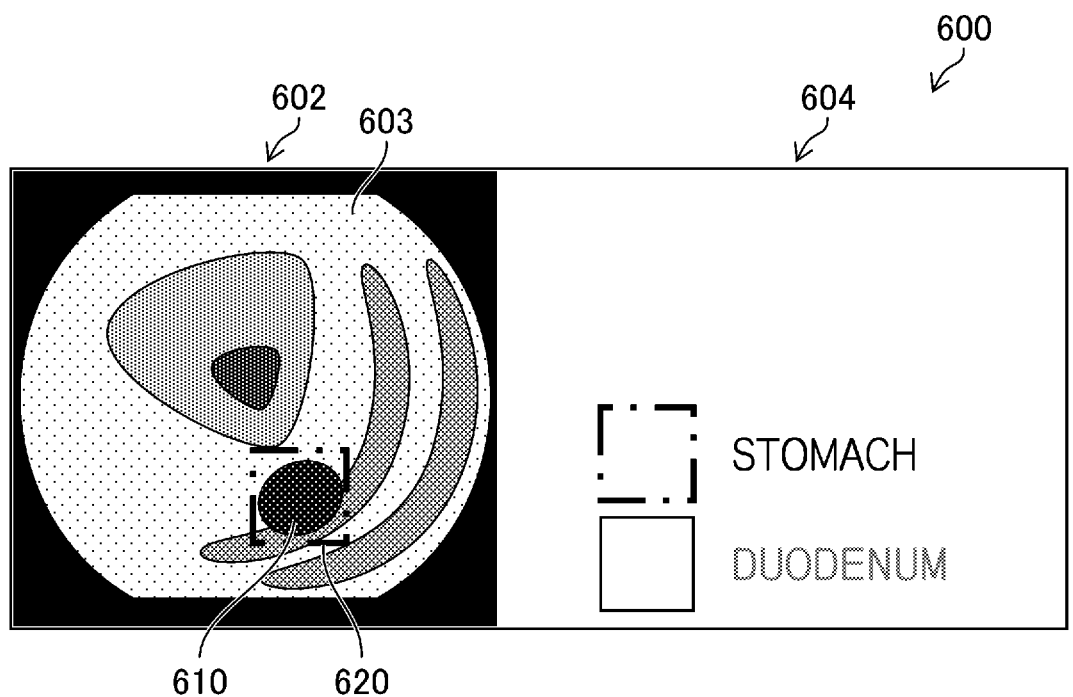
FIG. 12 is a diagram illustrating another example of display and reporting of a detection result of a region of interest.

FIG. 12 is a diagram illustrating another example of display and reporting of a detection result of a region of interest. In the example in FIG. 12, in the reporting region 604, a detector before switching (the detector for duodenum 224D; "DUODENUM" is displayed) is grayed out, and a detector after switching (the detector for stomach 224C) is emphasized. Such display also enables the user to easily grasp the detector for which a detection result is displayed, and switching of the detector. The display control unit 230 and the reporting processing unit 232 may stop displaying the grayed out detector after a determined time has elapsed from the switching (display may be performed only at and around the timing at which the switching occurs).

Figure 13:
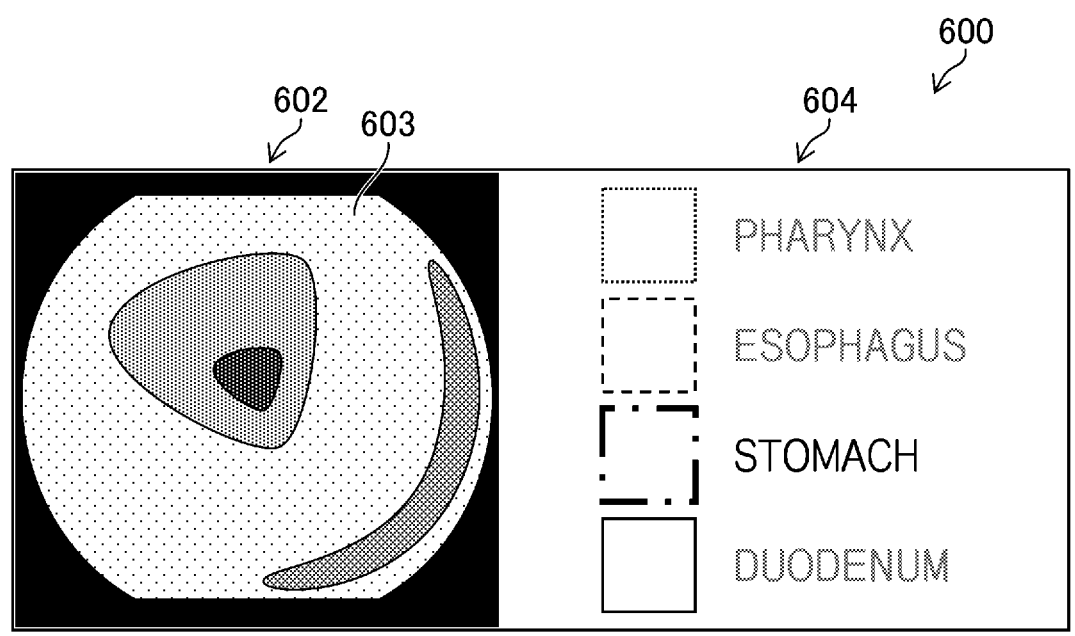
FIG. 13 is a diagram illustrating an example of reporting in a state in which a region of interest is not detected.

FIG. 13 is a diagram illustrating an example of reporting in a state in which no region of interest is detected (a mode in which all the detectors are operating and the detection result of the detector for stomach 224C is displayed). In the reporting region 604, the detector for stomach 224C is emphasized, and the other detectors are grayed out.

Figure 14A:
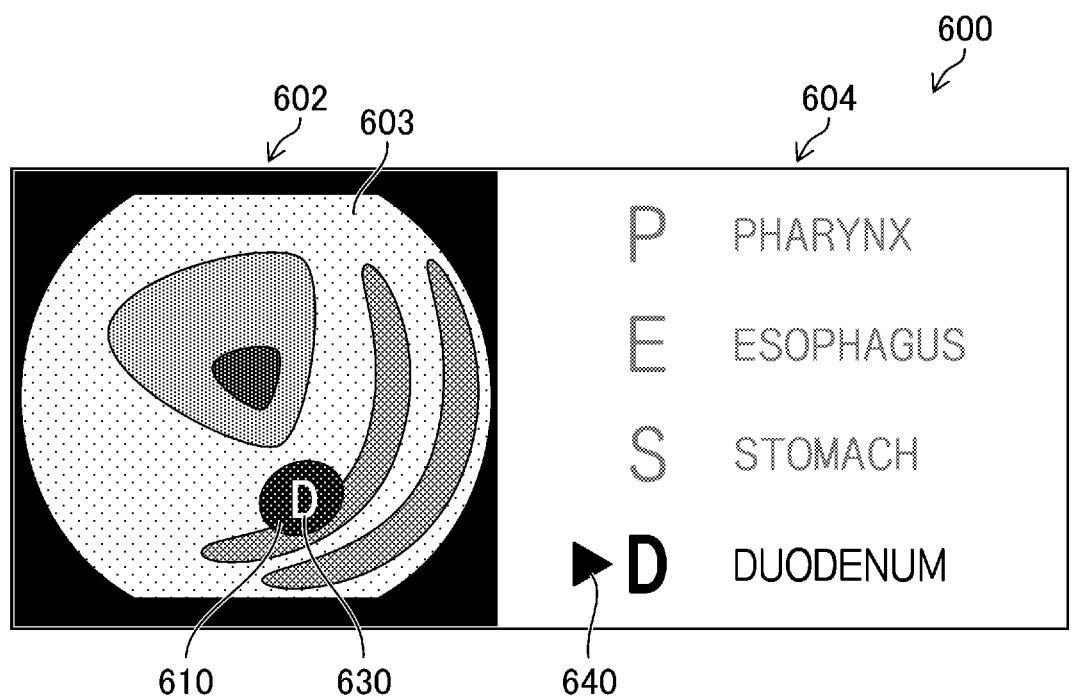
FIGS. 14A and 14B are diagrams illustrating still other examples of display and reporting of a detection result of a region of interest.
Figure 14B:
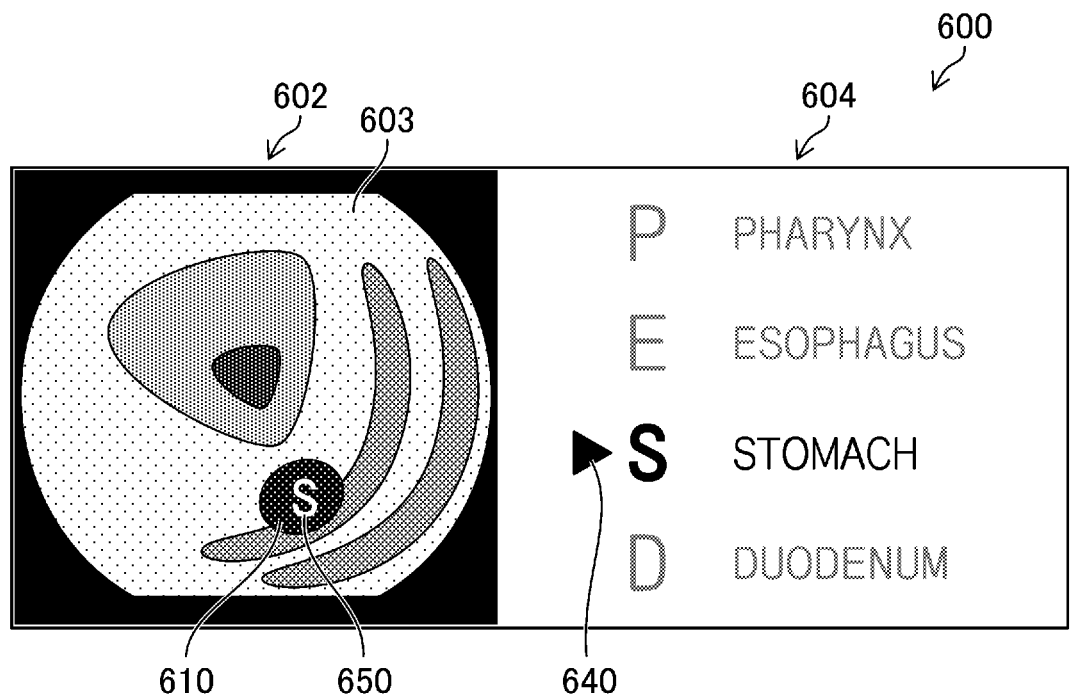

FIGS. 14A and 14B are diagrams illustrating still other examples of display and reporting of a detection result of a region of interest. In the examples in FIGS. 14A and 14B, the detection result obtained by each detector is indicated by the initial letter of the name of the organ. In FIG. 14A, the display control unit 230 and the reporting processing unit 232 (the processor 210) display a symbol 630 (the initial letter "D" of "DUODENUM") in a superimposed manner on the region of interest 610 in the image display region 602, thereby reporting the detection result obtained by the detector for duodenum 224D. In the reporting region 604, the display control unit 230 and the reporting processing unit 232 discriminatively display the detector for duodenum 224D, which is the target for which a detection result is displayed, by using a right-pointing triangular symbol 640, with the name of the detector (here, "DUODENUM") being emphasized and the names of the other detectors being grayed out. On the other hand, FIG. 14B illustrates a detection result displayed in a state in which the detector has been switched to the detector for stomach 224C. A symbol 650 (the initial letter "S" of "STOMACH") is displayed in a superimposed manner on the region of interest 610, and thereby the detection result obtained by the detector for stomach 224C is reported. In the same part, the detector for stomach 224C, which a target for which a detection result is displayed, is discriminatively displayed using a right-pointing triangular symbol 640, the name of the detector is emphasized, and the names of the other detectors are grayed out. Such a mode also enables the user to easily grasp the detector for which a detection result is displayed, and switching of the detector.

Regarding reporting of "the detector (detection process) for which a detection result is to be displayed", information about the detector for which a detection result is to be displayed may be directly reported as in the examples in FIGS. 11A to 14B, or information such as a determination result of an observation situation may be presented to perform indirect reporting.

As described above, according to the first embodiment, it is possible to appropriately switch the diagnosis assistance function, and the user is able to easily grasp the detector for which a detection result is displayed, and switching of the detector.

Acquisition of Imaging Information Using External Apparatus

As described above in the first embodiment, information about the imaging position and/or the imaging direction of the imaging apparatus can be acquired by an external apparatus (a determination apparatus) that determines the state of the endoscope 100 (an imaging apparatus). In the example illustrated in FIG. 15, a plurality of magnetism generators 140 (magnets, coils, or the like) that generate magnetism are provided in the endoscope 100. An endoscope shape measuring apparatus 500 (a determination apparatus) detects, using a magnetic antenna 510, the magnetism generated by the magnetism generators 140, and a processor 520 calculates the position and/or the shape of the endoscope 100 on the basis of the detection result. The imaging information acquiring unit 222 (a processor) of the endoscope system 10 acquires information on the calculated position and/or shape, and uses the information in a selection process.

Application to Other Medical Images

In the above-described first embodiment and modification, a description has been given of the case of performing recognition by using an endoscopic image (an optical endoscopic image), which is one aspect of a medical image. The medical image processing apparatus, the medical image processing method, and the medical image processing program according to the present invention can also be applied to the case of using a medical image other than an endoscopic image, such as images obtained in an ultrasonic endoscope apparatus (ultrasonic endoscope system) or an ultrasound image diagnosis apparatus.

APPENDICES

In addition to the above-described embodiment and modification, the configurations described below are included in the scope of the present invention.

Appendix 1

A medical image processing apparatus wherein
a medical image analysis processing unit (a processor) detects a region of interest on the basis of a feature quantity of pixels of a medical image, the region of interest being a region to be focused on, and
a medical image analysis result acquiring unit (a processor) acquires an analysis result of the medical image analysis processing unit.

Appendix 2

A medical image processing apparatus wherein
a medical image analysis processing unit detects presence or absence of a target to be focused on, on the basis of a feature quantity of pixels of a medical image, and
a medical image analysis result acquiring unit acquires an analysis result of the medical image analysis processing unit.

Appendix 3

The medical image processing apparatus wherein
the medical image analysis result acquiring unit
acquires the analysis result of the medical image from a recording device that records the analysis result, and
the analysis result is either or both of the region of interest which is a region to be focused on included in the medical image and the presence or absence of the target to be focused on.

Appendix 4

The medical image processing apparatus wherein the medical image is a normal-light image acquired by radiating light in a white range or light in a plurality of wavelength ranges as the light in the white range.

Appendix 5

The medical image processing apparatus wherein
the medical image is an image acquired by radiating light in a specific wavelength range, and
the specific wavelength range is a range narrower than a white wavelength range.

Appendix 6

The medical image processing apparatus wherein the specific wavelength range is a blue or green range in a visible range.

Appendix 7

The medical image processing apparatus wherein the specific wavelength range includes a wavelength range of 390 nm or more and 450 nm or less or a wavelength range of 530 nm or more and 550 nm or less, and the light in the specific wavelength range has a peak wavelength in the wavelength range of 390 nm or more and 450 nm or less or the wavelength range of 530 nm or more and 550 nm or less.

Appendix 8

The medical image processing apparatus wherein the specific wavelength range is a red range in a visible range.

Appendix 9

The medical image processing apparatus wherein the specific wavelength range includes a wavelength range of 585 nm or more and 615 nm or less or a wavelength range of 610 nm or more and 730 nm or less, and the light in the specific wavelength range has a peak wavelength in the wavelength range of 585 nm or more and 615 nm or less or the wavelength range of 610 nm or more and 730 nm or less.

Appendix 10

The medical image processing apparatus wherein the specific wavelength range includes a wavelength range in which a light absorption coefficient is different between oxyhemoglobin and deoxyhemoglobin, and the light in the specific wavelength range has a peak wavelength in the wavelength range in which the light absorption coefficient is different between oxyhemoglobin and deoxyhemoglobin.

Appendix 11

The medical image processing apparatus wherein the specific wavelength range includes a wavelength range of 400±10 nm, a wavelength range of 440±10 nm, a wavelength range of 470±10 nm, or a wavelength range of 600 nm or more and 750 nm or less, and the light in the specific wavelength range has a peak wavelength in the wavelength range of 400±10 nm, the wavelength range of 440±10 nm, the wavelength range of 470±10 nm, or the wavelength range of 600 nm or more and 750 nm or less.

Appendix 12

The medical image processing apparatus wherein
the medical image is an inside-of-living-body image depicting an inside of a living body, and
the inside-of-living-body image has information about fluorescence emitted by a fluorescent substance in the living body.

Appendix 13

The medical image processing apparatus wherein the fluorescence is acquired by irradiating the inside of the living body with excitation light whose peak is 390 nm or more and 470 nm or less.

Appendix 14

The medical image processing apparatus wherein
the medical image is an inside-of-living-body image depicting an inside of a living body, and
the specific wavelength range is a wavelength range of infrared light.

Appendix 15

The medical image processing apparatus wherein the specific wavelength range includes a wavelength range of 790 nm or more and 820 nm or less or a wavelength range of 905 nm or more and 970 nm or less, and the light in the specific wavelength range has a peak wavelength in the wavelength range of 790 nm or more and 820 nm or less or the wavelength range of 905 nm or more and 970 nm or less.

Appendix 16

The medical image processing apparatus wherein
a medical image acquiring unit (an image acquiring unit, a processor) includes a special-light image acquiring unit (a processor) that acquires a special-light image having information about the specific wavelength range on the basis of a normal-light image that is acquired by radiating light in a white range or light in a plurality of wavelength ranges as the light in the white range, and
the medical image is the special-light image.

Appendix 17

The medical image processing apparatus wherein a signal in the specific wavelength range is acquired through computation based on color information of RGB or CMY included in the normal-light image.

Appendix 18

The medical image processing apparatus including
a feature quantity image generating unit (a processor) that generates a feature quantity image through computation based on at least one of a normal-light image or a special-light image, the normal-light image being acquired by radiating light in a white range or light in a plurality of wavelength ranges as the light in the white range, the special-light image being acquired by radiating light in a specific wavelength range, wherein
the medical image is the feature quantity image.

Appendix 19

An endoscope apparatus (an endoscope system) including:
the medical image processing apparatus according to any one of appendices 1 to 18; and
an endoscope (endoscope scope) that acquires an image by radiating at least any one of light in a white wavelength range or light in a specific wavelength range.

Appendix 20

A diagnosis assistance apparatus including the medical image processing apparatus according to any one of appendices 1 to 18.

Appendix 21

A medical work assistance apparatus including the medical image processing apparatus according to any one of appendices 1 to 18.

The embodiment of the present invention and other examples have been described above. The present invention is not limited to the above-described aspects, and various modifications can be made without deviating from the spirit of the present invention.

REFERENCE SIGNS LIST 10 endoscope system
100 endoscope
102 handheld operation section
104 insertion section
106 universal cable
108 light guide connector
112 soft part
114 bending part
116 tip rigid part
116A distal-end-side surface
123 illumination unit
123A illumination lens
123B illumination lens
126 forceps port
130 imaging optical system
132 imaging lens
134 imaging element
136 driving circuit
140 magnetism generator
141 air/water supply button
142 suction button
143 function button
144 imaging button
170 light guide
200 medical image processing unit
202 image input controller
205 communication control unit
206 video output unit
207 recording unit
208 operation unit
209 audio processing unit
209A speaker
210 processor
211 ROM
212 RAM
220 image acquiring unit
222 imaging information acquiring unit
224 detector
224A detector for pharynx
224B detector for esophagus
224C detector for stomach
224C1 detector for normal light
224C2 detector for special light
224D detector for duodenum
224E recognizer for pharynx
224E1 detector for pharynx
224E2 classifier for pharynx
224F recognizer for esophagus
224F1 detector for esophagus
224F2 classifier for esophagus
224G recognizer for stomach
224G1 detector for stomach
224G2 classifier for stomach
224H recognizer for duodenum
224H1 detector for duodenum
224H2 classifier for duodenum
226 selection unit
228 switching control unit
230 display control unit
232 reporting processing unit
234 recording control unit
250 input layer
252 intermediate layer
254 output layer
256 convolutional layer 258 pooling layer
260 fully connected layer
300 light source apparatus
310 light source
310B blue light source
310G green light source
310R red light source
310V violet light source
330 diaphragm
340 condenser lens
350 light source control unit
400 monitor
500 endoscope shape measuring apparatus
510 magnetic antenna
520 processor
600 screen
602 image display region
603 endoscopic image
604 reporting region
610 region of interest
620 bounding box
630 symbol
640 symbol
650 symbol
$F_1$ filter
$F_2$ filter
S100-S180 individual steps of medical image processing method
$\Delta t1$ period
$\Delta t2$ period

What is claimed is:

1. A medical image processing apparatus comprising a processor,
the processor being configured to execute:
an image acquisition process of acquiring a time-series medical image;
a plurality of detection processes of detecting a region of interest from the acquired medical image;
a display control process of causing a display apparatus to display at least one detection result among detection results obtained in the plurality of detection processes;
a selection process of selecting, from among the plurality of detection processes, a detection process for which a detection result is to be displayed on the display apparatus; and
a switching control process of controlling, in accordance with a detection state of the region of interest in the plurality of detection processes, whether or not to permit switching of a detection process for which a detection result is to be displayed to the selected detection process.

2. The medical image processing apparatus according to claim 1, wherein the processor is configured not to
in the switching control process, permit the switching around a time at which a determination is made that a region of interest is present in the medical image in at least one of the plurality of detection processes.

3. The medical image processing apparatus according to claim 1, wherein the processor is configured to
in the switching control process, permit the switching around a time at which a determination is made that a region of interest is absent in the medical image in at least one of the plurality of detection processes.

4. The medical image processing apparatus according to claim 1, wherein the processor is configured to
in the switching control process, stop a detection process for which a detection result is not to be displayed on the display apparatus.

5. The medical image processing apparatus according to claim 4, wherein the processor is configured to
in the switching control process, start a detection process that has been switched to a state of displaying a detection result.

6. The medical image processing apparatus according to claim 1, wherein the processor is configured to further execute:
a reporting process of reporting, to a user, which detection process is a detection process for which a detection result is to be displayed on the display apparatus.

7. The medical image processing apparatus according to claim 1, wherein the processor is configured to
acquire, from the medical image, information indicating an imaging position and/or an imaging direction of the medical image, and perform the selecting on the basis of the acquired information.

8. The medical image processing apparatus according to claim 1, wherein the processor is configured to
acquire, from a determination apparatus configured to determine a state of an imaging apparatus configured to capture the medical image, information indicating an imaging position and/or an imaging direction of the medical image, and perform the selecting on the basis of the acquired information.

9. The medical image processing apparatus according to claim 1, wherein the processor is configured to
in the display control process, change a display mode of a detection result to be displayed on the display apparatus in accordance with a detection process.

10. The medical image processing apparatus according to claim 1, wherein the processor is configured to
upon switching of a detection process for which a detection result is to be displayed in the switching control process, report that the switching has been performed.

11. An endoscope system comprising:
the medical image processing apparatus according to claim 1;
an endoscope to be inserted into a subject, the endoscope having an imaging unit configured to sequentially capture a plurality of the medical images; and
the display apparatus.

12. A medical image processing method to be executed by a medical image processing apparatus comprising a processor, the medical image processing method comprising:
an image acquisition step of acquiring a time-series medical image;
a detection step of detecting a region of interest from the acquired medical image by using a plurality of detectors;
a display control step of causing a display apparatus to display a detection result for at least one detector among detection results obtained by the plurality of detectors;
a selection step of selecting, from among the plurality of detectors, a detector for which a detection result is to be displayed on the display apparatus; and
a switching control step of controlling, in accordance with a detection state of the region of interest in the plurality of detectors, whether or not to permit switching of a detector for which a detection result is to be displayed to the selected detector.

13. A non-transitory, computer-readable tangible recording medium storing a program for causing, when read by a computer, the computer to execute the medical image processing method according to claim 12.

\* \* \* \* \*